(12) United States Patent
Oshimo

(10) Patent No.: US 9,345,630 B2
(45) Date of Patent: May 24, 2016

(54) UPPER FRAME POSITION HOLDING STRUCTURE AND AMBULANCE VIBRATION-PROOF RACK HAVING UPPER FRAME POSITION HOLDING STRUCTURE

(71) Applicant: Delta Tooling Co., Ltd., Hiroshima-shi (JP)

(72) Inventor: Hiroki Oshimo, Hiroshima (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 106 days.

(21) Appl. No.: 14/356,005

(22) PCT Filed: Nov. 2, 2012

(86) PCT No.: PCT/JP2012/078527
§ 371 (c)(1),
(2) Date: May 2, 2014

(87) PCT Pub. No.: WO2013/069578
PCT Pub. Date: May 16, 2013

(65) Prior Publication Data
US 2014/0300123 A1    Oct. 9, 2014

(30) Foreign Application Priority Data

Nov. 8, 2011   (JP) .................................. 2011-244205

(51) Int. Cl.
*A61G 1/06* (2006.01)
*A61G 3/02* (2006.01)
(Continued)

(52) U.S. Cl.
CPC .............. *A61G 3/0254* (2013.01); *F16F 6/005* (2013.01); *F16F 15/03* (2013.01)

(58) Field of Classification Search
CPC .......... A61G 1/06; A61G 3/08; A61G 3/0816; A61G 3/0825; F16F 15/03
USPC .................................... 410/87, 88; 296/19, 20
See application file for complete search history.

(56) References Cited

U.S. PATENT DOCUMENTS 2,599,863 A * 6/1952 Riemvis ......................... 248/167
3,644,944 A * 2/1972 Bourgraf et al. .................. 5/610
(Continued)

FOREIGN PATENT DOCUMENTS

DE     3608448 A1 * 8/1987
DE     4112270 C1 * 7/1992
(Continued)

OTHER PUBLICATIONS

International Search Report issued on Jan. 15, 2013, in PCT/JP2012/078527, filed Nov. 2, 2012.

*Primary Examiner* — H Gutman
(74) *Attorney, Agent, or Firm* — Oblon, McClelland, Maier & Neustadt, L.L.P.

(57) ABSTRACT

An upper frame swingable between an inclined posture and a substantially horizontal posture along a trajectory of movement of a four-bar linkage is held in the substantially horizontal posture by a simple operation when necessary. A front link mechanism control gives an external force for pushing down an operation member to thereby control a front link mechanism so as to displace the upper frame rearward while lowering a front side of the upper frame. Since a displacement direction for bringing the upper frame into the substantially horizontal posture and an operation direction for locking the front link mechanism or a rear link mechanism by the operation of the operation member are substantially the same direction, it is possible to perform two movements, the displacement movements to the substantially horizontal posture and the locking movements, only by operating the operation member in a predetermined direction.

12 Claims, 18 Drawing Sheets

(51) Int. Cl.
  *F16F 15/03*  (2006.01)
  *F16F 6/00*  (2006.01)

(56) References Cited

U.S. PATENT DOCUMENTS

| | | |
|---|---|---|
| 6,241,059 B1 | 6/2001 | Fujita et al. |
| 6,325,363 B1 | 12/2001 | Sakamoto |
| 2003/0071472 A1* | 4/2003 | Henderson et al. ............ 296/20 |
| 2015/0216746 A1* | 8/2015 | Dirauf et al. |

FOREIGN PATENT DOCUMENTS

| | | | |
|---|---|---|---|
| DE | 4340358 A1 | * | 6/1994 |
| DE | 19607899 A1 | * | 9/1997 |
| EP | 2213267 A1 | * | 8/2010 |
| FR | 2651998 A1 | * | 3/1991 |
| JP | 05-031140 A | | 2/1993 |
| JP | 2000-126233 A | | 5/2000 |
| JP | 2000-245774 A | | 9/2000 |
| JP | 2006-075203 A | | 3/2006 |
| JP | 2011-125805 A | | 6/2011 |
| JP | 2012-205872 | | 10/2012 |

* cited by examiner (b)

(a)

(b) Flux-concentration type.

(a) Interlinkage flux type.

(b) Flux-concentration type.

(a) Interlinkage flux type.

UPPER FRAME POSITION HOLDING STRUCTURE AND AMBULANCE VIBRATION-PROOF RACK HAVING UPPER FRAME POSITION HOLDING STRUCTURE

TECHNICAL FIELD

The present invention relates to an an upper frame position holding structure which holds an upper frame of an ambulance vibration-proof rack provided in an ambulance to support a stretcher having the sick or wounded thereon and absorbing a vibration and an impact applied to the sick or wounded during the conveyance, in a substantially horizontal posture when necessary, and to an ambulance vibration-proof rack including the upper frame position holding structure.

BACKGROUND ART

As an ambulance vibration-proof rack, there has been known, for example, one disclosed in Patent Document 1 proposed by the present applicant. This includes a swingable upper frame provided to lower frames via a link mechanism and swings up and down and back and forth by a vibration transmitted when an ambulance is travelling, owing to a repulsive force of first permanent magnets which are attached to the lower frames and the upper frame, with their repulsive magnetic poles facing each other. On the other hand, when the sick or wounded placed on a stretcher is given a predetermined treatment such as a cardiac massage, a vibration-proof rack needs to be locked so as not to move, but in the type swinging up and down and back and forth as disclosed in Patent Document 1, the easy locking has been difficult. In view of this point, as disclosed in Patent Document 2, the present applicant has proposed a mechanism for easily and quickly locking the ambulance vibration-proof rack which swings up and down and back and forth as disclosed in Patent Document 1.

PRIOR ART DOCUMENTS

Patent Document

Patent Document 1: Japanese Patent Application Laid-open No. 2000-126233
Patent Document 2: Japanese Patent Application Laid-open No. 2000-245774

DISCLOSURE OF THE INVENTION

Problems to be Solved by the Invention

Incidentally, the ambulance vibration-proof rack of Patent Document 1 is capable of achieving improvement in comfortable riding and so on by vibration absorption, but it has a structure in which a vibration absorbing mechanism mainly functioning to suppress a vibration in an up and down direction and a vibration absorbing mechanism mainly functioning to suppress a vibration in a back and forth direction are separately provided, and as both of the mechanisms, those having complicated structures are used, which becomes a cause to increase weight. In view of this point, the present applicant has proposed, as Japanese Patent Application No. 2011-125805, an ambulance vibration-proof rack in which an upper frame swings according to a trajectory of movement of a four-bar linkage and an up and down or a back and forth input vibration is absorbed by being converted to a half-pendulum motion. This ambulance vibration-proof rack is structured to have a position where the upper frame takes a substantially horizontal posture in the trajectory of movement, while, at other positions, it swings so as to take an inclined posture with its front side locating higher than its rear side, and this structure is high in vibration input absorbability and also has a high effect of suppressing nose dive.

The lock mechanism disclosed in Patent Document 2 is applied to the ambulance vibration-proof rack which swings up and down and back and forth while the upper frame constantly keeps a substantially horizontal posture, and therefore it is only necessary that the upper frame can be locked at an appropriate position. However, in Japanese Patent Application No. 2011-125805, the inclined posture is always taken at positions except a top dead center of a centrode at which the substantially horizontal posture is taken. Accordingly, if an operation for stopping the swinging of the upper frame at the time of a treatment such as a cardiac massage is performed at an appropriate swinging position, there can occur a case where the upper frame is locked while kept in the inclined state relative to a base frame. The stretcher itself, after placed on the upper frame, is fixed to the upper frame by a stretcher fixing means. Accordingly, if the operation for stopping the swinging of the upper frame is performed while the upper frame is kept in the inclined state and in this state, a rear hatch of an ambulance which has arrived at a hospital or the like is opened and an operation of releasing the stretcher fixing means is performed, there is a possibility that the stretcher comes out along the inclination direction because the upper frame is kept inclined. Further, at the time of loading and unloading of the stretcher, the work is more easily performed when the upper frame is fixed in the substantially horizontal posture than when the upper frame is fixed in the inclined posture.

The present invention was made in view of the above, and its object is to provide an upper frame position holding structure capable of holding an upper frame which is capable of swinging between an inclined posture and a substantially horizontal posture along a trajectory of movement of a four-bar linkage, in the substantially horizontal posture with a simple operation when necessary and an ambulance vibration-proof rack including the upper frame position holding structure.

Means for Solving the Problem

In order to solve the aforesaid problem, the upper frame position holding structure of the present invention is an upper frame position holding structure used for an ambulance vibration-proof rack having a stretcher-supporting upper frame which is attached to a base frame via a link mechanism including a front link mechanism located on a front side and a rear link mechanism located on a rear side, is swingable along a trajectory of movement of a four-bar linkage by the link mechanism, and has a position where a substantially horizontal posture is taken in the trajectory of movement, while, at other positions, taking an inclined posture with a front side being located higher than a rear side, wherein, irrespective of a position of the upper frame in the trajectory of movement, the link mechanism is locked in a state where the upper frame is displaced to the substantially horizontal posture.

Preferably, the upper frame position holding structure of the present invention includes a front link mechanism control means having an operation member which, when given an external force, brings the upper frame into the substantially horizontal position by displacing the upper frame rearward while lowering the front side of the upper frame, and locking the front link mechanism in the state where the upper frame is brought into the substantially horizontal posture to hold the upper frame in the substantially horizontal posture. Preferably, when the operation member is given the external force in a direction so as to be pushed down, the front link mechanism control means displaces the upper frame rearward while lowering the front side of the upper frame.

Preferably, the front link mechanism has: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket, and the rear link mechanism has a rear link member which has a lower end pivotally supported by the base frame and an upper end pivotally supported by the upper frame and which displaces in a standing direction in accordance with the displacement in the direction for the substantially horizontal posture, with the upper end side turning rearward around the lower end, the front link mechanism control means has: an engaged portion attached to a support shaft via which the front link member is pivotally supported by the lower portion of the upper-side front bracket and turning forward to thereby turn the front link member via the support shaft in the standing direction around the pivotal support position on the upper portion of the base-side front bracket; and a lock member including an engaging portion which engages with the engaged portion when the engaged portion turns forward, and the front link mechanism control means operates so as to cause the engaging portion of the lock member to engage with the engaged portion when the operation member is given the external force in the direction so as to be pushed down.

Preferably, the engaged portion includes a roller bracket fixed to the support shaft and a roller rotatably supported by the roller bracket, the lock member has a groove portion as the engaging portion and has a guide surface provided adjacent to the groove portion and abuttable on the roller of the engaged portion, and when the operation member is pushed down, the front link member turns in the standing direction to displace the upper frame into the substantially horizontal posture, the lock member rotates from an upper direction in a rear downward direction, the guide surface abuts on the roller, and the roller relatively displaces along the guide surface to engage with the groove portion.

Preferably, the upper frame position holding structure of the present invention has a rear link mechanism control means having an operation member which, when given an external force, brings the upper frame into the substantially horizontal posture by displacing the upper frame rearward while raising the rear side of the upper frame, and locking the rear link mechanism in the state where the upper frame is brought into the substantially horizontal posture, to hold the upper frame in the substantially horizontal posture. Preferably, when the operation member is given the external force in a direction so as to be drawn rearward, the rear link mechanism control means displaces the upper frame rearward while raising the rear side of the upper frame.

Preferably, the front link mechanism has: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket, and the rear link mechanism has a rear link member which has a lower end pivotally supported by the base frame and an upper end pivotally supported by the upper frame and which displaces in a standing direction in accordance with the displacement in the direction for the substantially horizontal posture, with the upper end side turning rearward around the lower end, the rear link mechanism control means has: a turning member whose upper end is pivotally supported by the upper frame together with the upper end of the rear link member and whose middle portion closer to the lower end is abuttable on the support shaft of the rear link member; a slope as the operation member provided on the rear side of the upper frame so as to be inclinable rearward from a standing position; a plate member provided in a posture with one end pivotally supported at a pivotal support position of the slope on the upper frame and with another end extending downward when the slope is at the standing position, and displacing between a standing position and an inclination position in accordance with a movement of the slope; and a rod member having one end pivotally supported by the lower end of the turning member and having another end pivotally supported by the other end of the plate member, and when the slope is inclined to give the external force causing the upper frame to be drawn rearward, the plate member turns to displace from the standing position at which the plate member becomes substantially vertical to the rod member to the inclination position at which the plate member becomes substantially on a same straight line with the rod member, and when the rear link member is displaced in a direction so as to stand to make the middle portion of the turning member abut on the support shaft, the upper frame is held in the substantially horizontal posture.

An ambulance vibration-proof rack of the present invention is an ambulance vibration-proof rack which includes a base frame and an upper frame attached to the base frame via a link mechanism and swingable up and down and back and forth relatively to the base frame, and supports a stretcher on the upper frame, wherein the link mechanism includes a front link mechanism located on front sides of the base frame and the upper frame and a rear link mechanism located on rear sides of the base frame and the upper frame, the upper frame is swingable along a trajectory of movement of a four-bar linkage by the link mechanism, has a position at which a substantially horizontal posture is taken in the trajectory of movement, while, at other positions, taking an inclined posture, with a front side being located higher than a rear side, and converts an input up and down or back and forth vibration into a half-pendulum motion along the trajectory of movement of the four-bar linkage to absorb the input vibration, and the ambulance vibration-proof rack has the upper frame position holding structure of any of the above.

Preferably, a centrode of the four-bar linkage from a top dead center to a bottom dead center is set so as to substantially match with a virtual line passing a center of gravity of the upper frame. Preferably, the inclined posture at the bottom dead center is set so that the front side is inclined upward relatively to a horizontal direction by an inclination angle within a range of 3 to 10 degrees.

Preferably, the front link mechanism has: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket, and the rear link mechanism has a rear link member which has a lower end pivotally supported by the base frame and an upper end pivotally supported by the upper frame and which displaces in a standing direction in accordance with the displacement in the direction for the substantially horizontal posture, with the upper end side turning rearward around the lower end.

Preferably, a magnetic spring is included which includes permanent magnets coupled to one of the base frame and the upper frame and disposed at predetermined intervals and a movable-side permanent magnet slidable between the permanent magnets and coupled to the other of the base frame and the upper frame.

Preferably, a vibration absorbing mechanism which absorbs a vibration between the base frame and the upper frame is further provided, and the vibration absorbing mechanism has at least one damper out of the following dampers a) to c):

a) a magnetic damper of an interlinkage flux type including permanent magnets coupled to one of the base frame and the upper frame and disposed at predetermined intervals and a conductor slidable between the permanent magnets and coupled to the other of the base frame and the upper frame;

b) a magnetic damper of a flux-concentration type including a cylinder coupled to one of the base frame and the upper frame and a piston inserted to be reciprocatable in an axial direction in the cylinder and coupled to the other of the base frame and the upper frame, the cylinder including a cylindrical conductor and a yoke which covers an outer peripheral surface of the conductor, and the piston including a plurality of permanent magnets which are disposed along an axial direction of the cylinder with the same poles thereof facing each other and a yoke which is disposed between the adjacent permanent magnets; and c) an oil damper including a cylinder coupled to one of the base frame and the upper frame and a piston inserted to be reciprocatable in an axial direction in the cylinder and coupled to the other of the base frame and the upper frame.

Effect of the Invention

According to the upper frame position holding structure of the present invention, the upper frame swingable along the trajectory of movement of the four-bar linkage between the inclined posture and the substantially horizontal posture can be forcibly displaced to and held in the substantially horizontal posture. Therefore, when a predetermined treatment such as a cardiac massage is performed, when the stretcher is loaded or unloaded, and so on, it is possible to easily bring the upper frame into the substantially horizontal posture when necessary, at whichever position in the trajectory of movement of the four-bar linkage the upper frame is located.

When, as the upper frame position holding structure, the front link mechanism control means is provided, it is preferable that the front link mechanism is controlled so that, by giving the external force causing the operation member to be pushed down, the upper frame is displaced rearward while the front side of the upper frame is lowered. Further, when the rear link mechanism control means is provided, it is preferable that the rear link mechanism is controlled so that, by inclining the slope as the operation member from the standing position to give the external force causing the upper frame to be drawn rearward, the upper frame is displaced rearward while the rear side of the upper frame is raised. Owing to these, the displacement direction for bringing the upper frame into the substantially horizontal posture and the operation direction for locking the front link mechanism or the rear link mechanism by the operation of the operation member become substantially the same direction, and therefore, only by the operation of giving the external force in a predetermined direction to the operation member, it is possible to perform the two movements, the displacement movement of the upper frame to the substantially horizontal posture and the locking movement in this posture.

Further, according to the ambulance vibration-proof rack of the present invention, at the bottom dead center of the centrode, the upper frame takes the inclined posture where its front side is located higher than its rear side, and at the top dead center, the upper frame is swingable along the trajectory of movement of the four-bar linkage so as to take the substantially horizontal posture, and it is possible to convert the up and down or back and forth input vibration input during the travelling into the half-pendulum motion along the trajectory of movement of the four-bar linkage and absorb it. Specifically, triggered by the back and forth vibration given by acceleration/deceleration during the travelling, a rotating motion occurs, and accordingly, due to this rotating motion, the input up and down vibration is also converted to a rotation motion and is effectively alleviated. Further, owing to the swinging along the trajectory of movement of the four-bar linkage between the inclined posture where the front side is located higher and the substantially horizontal posture, the head of the sick or wounded does not become lower than a horizontal direction, and further at the time of deceleration, since the rotation center of the front link member in the front link mechanism is at the pivotal support position on the upper portion of the base-side front bracket, the upper frame is inclined so that its front side (head side) is higher. This has a high effect of preventing nose dive.

By utilizing the half-pendulum motion as the structure enabling to thus take the inclined posture, the ambulance vibration-proof rack of the present invention exhibits high vibration-proof performance and is also high in the effect of preventing the nose dive, but in addition to this structure, having the aforesaid upper frame position holding structure, the ambulance vibration-proof rack has advantages that it is possible to easily bring the upper frame into the substantially horizontal posture when necessary and it is possible to smoothly perform a treatment such as a cardiac massage, a loading/unloading work of the stretcher, and the like.

MODE FOR CARRYING OUT THE INVENTION

Figure 1:
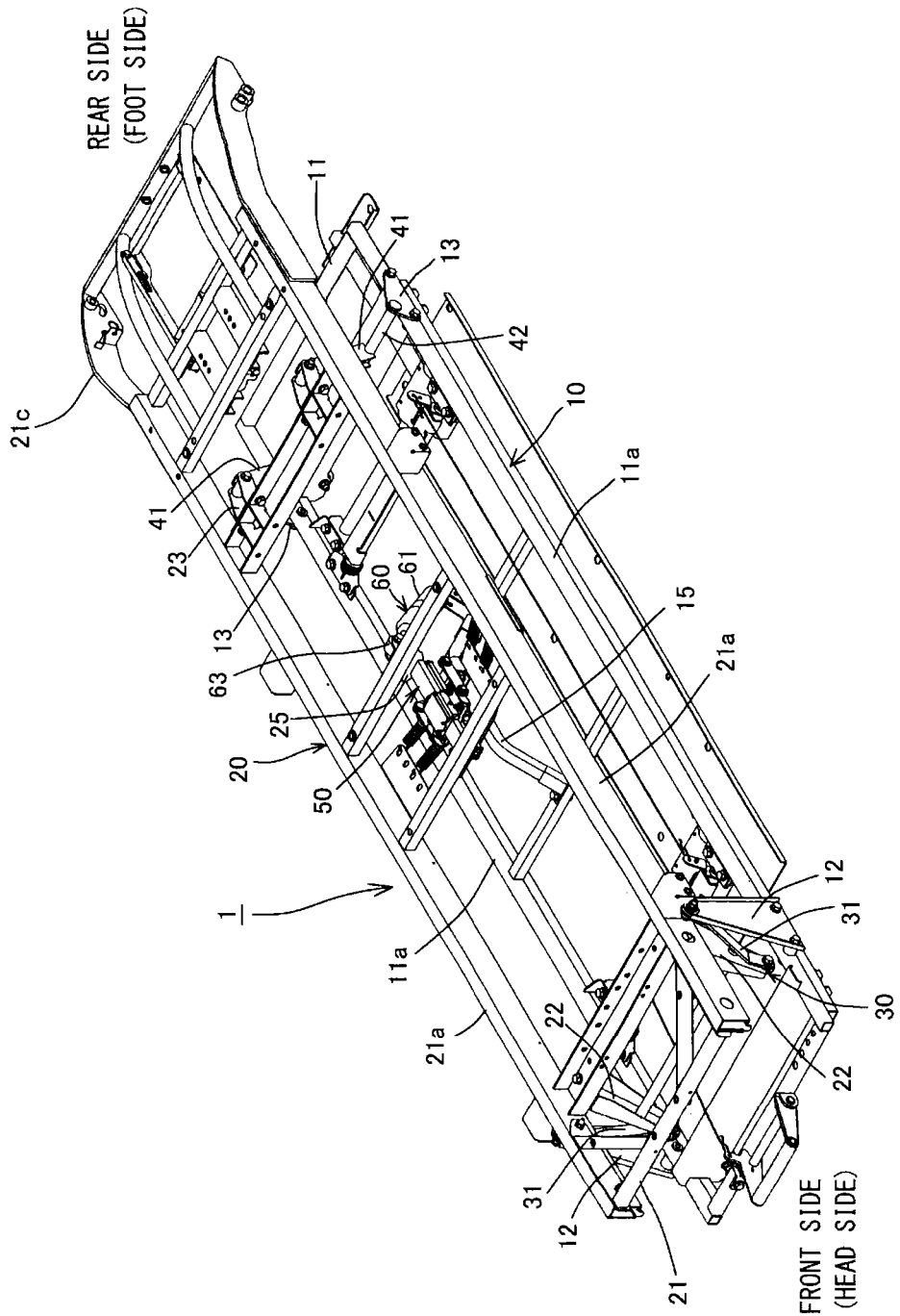
FIG. 1 is a perspective view illustrating a skeletal frame of an ambulance vibration-proof rack according to one embodiment of the present invention.

Hereinafter, the present invention will be described in more detail based on an embodiment illustrated in the drawings. First, based on FIG. 1 to FIG. 6, the basic structure and operation of an ambulance vibration-proof rack 1 to which the upper frame position holding structure of the present invention is applied will be described. The ambulance vibration-proof rack 1 includes a base frame 10 and an upper frame 20.

The base frame 10 has an outer frame member 11 formed in a substantially rectangular shape in a plane view. On front sides (a head side of a person placed on a stretcher) of side frames 11a of the outer frame member 11, base-side front brackets 12 protruding upward are provided. On rear sides (a foot side of the person placed on the stretcher) of the side frames 11a, base-side rear brackets 13 lower in height than the base-side front brackets 12 are provided.

The upper frame 20 has an outer frame member 21 formed in a substantially rectangular shape in a plane view, and on front sides of side frames 21a, upper-side front brackets 22 protruding downward are provided. The base-side front brackets 12 and the upper-side front brackets 22 are provided in such a positional relation that upper portions of the base-side front brackets 12 are located higher than lower portions of the upper-side front brackets 22. Further, on a rear side of the upper frame 20, guide portions 21c curving more downward as they go toward a rear end side are formed in order to facilitate the loading of the stretcher.

A link mechanism includes a front link mechanism 30 located on the front sides of the base frame 10 and the upper frame 20 and a rear link mechanism 40 located on their rear sides. The front link mechanism 30 includes front link members 31 having upper ends pivotally supported by the upper portions of the base-side front brackets 12 and having lower ends pivotally supported by the lower portions of the upper-side front brackets 22. The rear link mechanism 40 includes a support shaft 42 pivotally supported between the pair of base-side rear brackets 13 facing with each other in a width direction and rear link members 41 having lower ends fixed to the support shaft 42 by welding or the like and having upper ends pivotally supported by upper-side rear brackets 23 provided on the upper frame 20.

A vibration absorbing mechanism in this embodiment includes a first vibration absorbing mechanism 50 and a second vibration absorbing mechanism 60. The first vibration absorbing mechanism 50 is a mechanism including a magnetic damper part 510 and a magnetic spring part 520. Near a longitudinal center of the base frame 10, an attraction-type magnet unit 51 in which first, second, and third permanent magnets 51a, 51b, 51c are disposed at predetermined intervals with different poles facing each other and with different poles adjacent to each other is supported on a hill-shaped frame 15 provided in a substantially hill-shaped curve as illustrated in FIG. 1 and FIGS. 4(a) to (c). On a center bracket 25 provided on the upper frame 20 at a position corresponding to the hill-shaped frame 15, a conductor 52a such as copper and a movable-side permanent magnet 52b are supported. The conductor 52a is provided so as to be between, for example, the first and second permanent magnets 51a, 51b and the movable-side permanent magnet 52b is provided so as to be between, for example, the second and third permanent magnets 51b, 51c. Consequently, the magnetic damper part (magnetic damper of an interlinkage flux type) 510 is formed by the first and second permanent magnets 51a, 51b and the conductor 52a, and the magnetic spring part 520 is formed by the second and third permanent magnets 51b, 51c and the movable-side permanent magnet 52b.

Therefore, when the upper frame 20 moves back and forth relatively to the base frame 10, a predetermined damping ratio is obtained due to a damping coefficient of the magnetic damper part 510 and a spring constant of the magnetic spring part 520.

Figure 2:
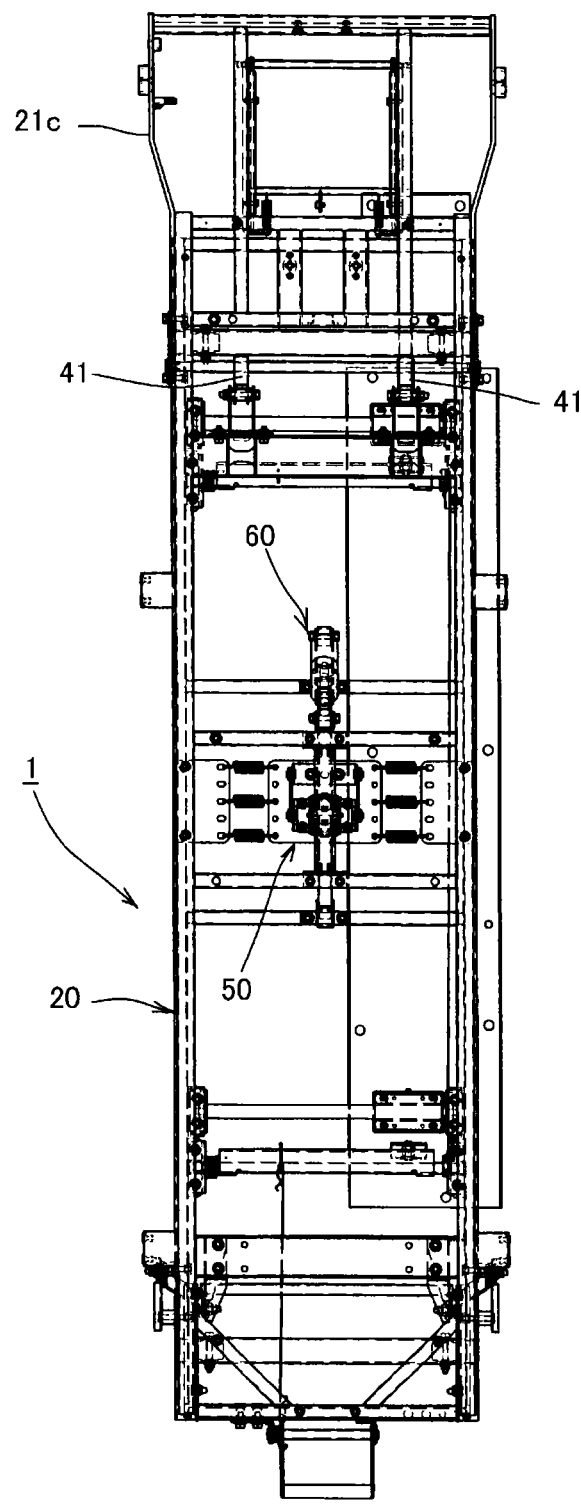
FIG. 2 is a plane view of FIG. 1.
Figure 3:
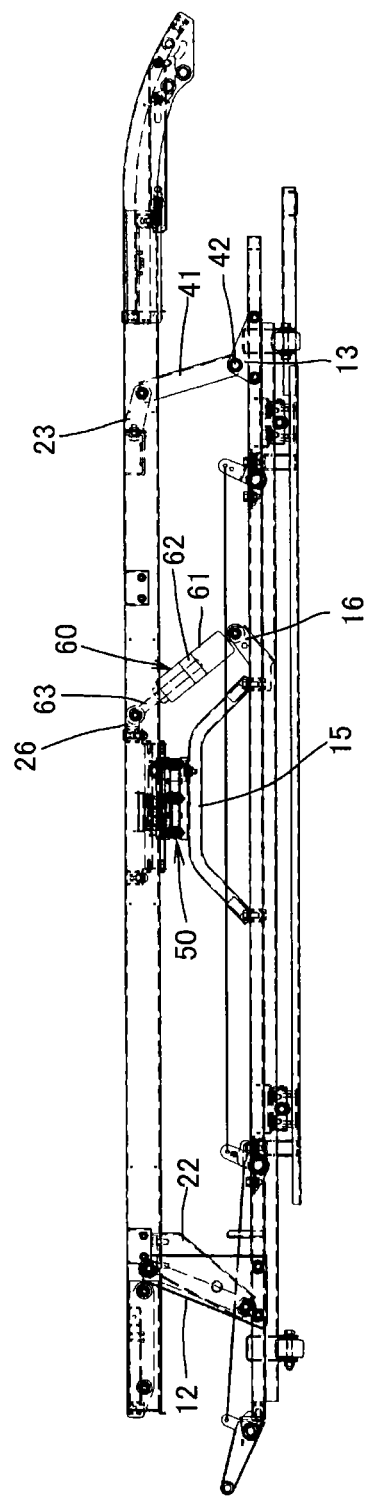
FIG. 3 is a side view of FIG. 1.
Figure 4:
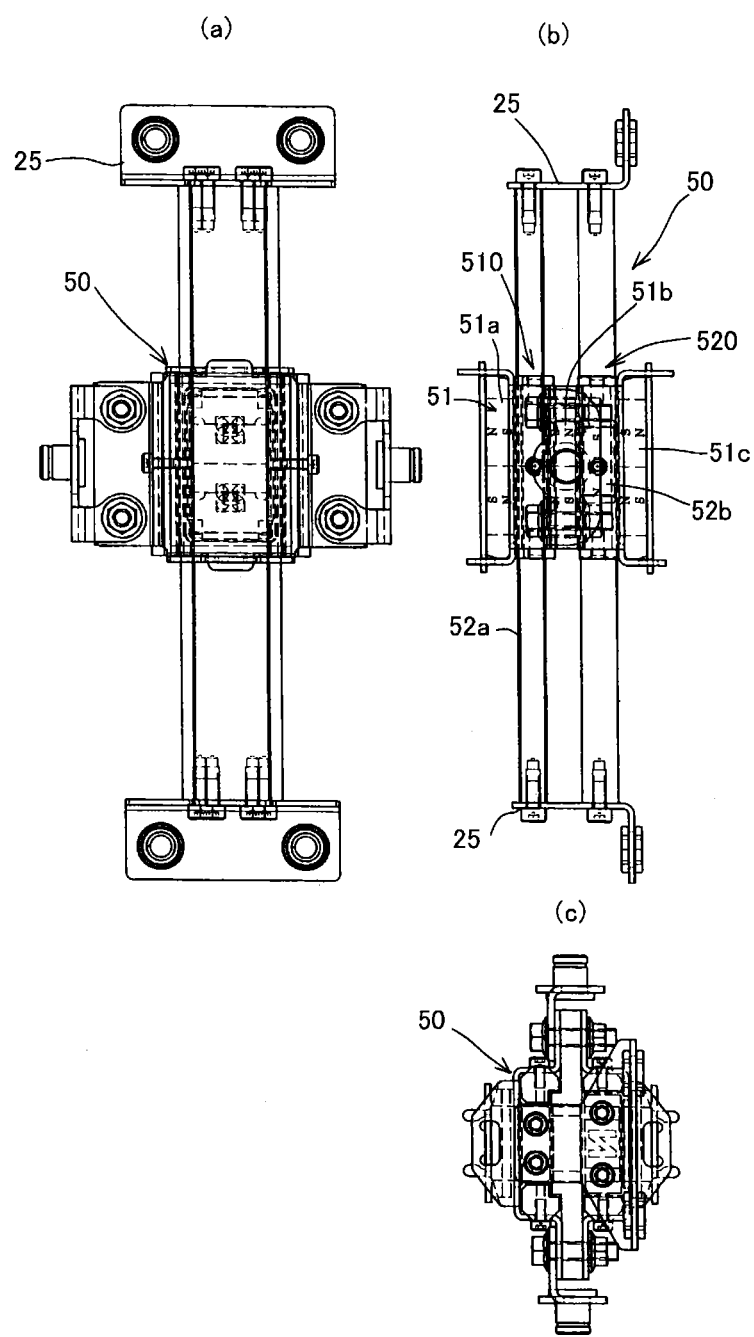
FIG. 4 are views illustrating a first vibration absorbing mechanism, (a) being a bottom view, (b) being a side view, and (c) being a front view.

As illustrated in FIG. 1 to FIG. 3, the second vibration absorbing mechanism 60 is constituted by a magnetic damper of a flux-concentration type including a cylinder 61 and a piston 62 sliding in the cylinder 61, a bottom portion of the cylinder 61 is pivotally supported by a cylinder bracket 16 of the base frame 10, a projecting end portion of a piston rod 63 to which the piston 62 is coupled is pivotally supported by a piston bracket 26 of the upper frame 20, and the second vibration absorbing mechanism 60 mainly absorbs an up and down vibration.

Figure 5:
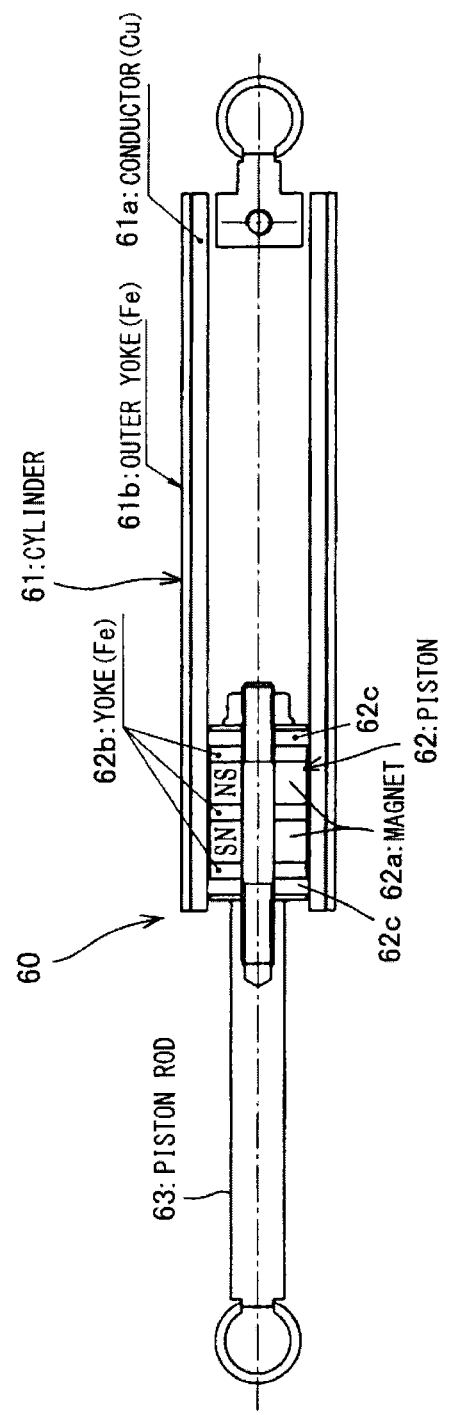
FIG. 5 is an explanatory view of a magnetic damper constituting a second vibration absorbing mechanism.
Figure 6:
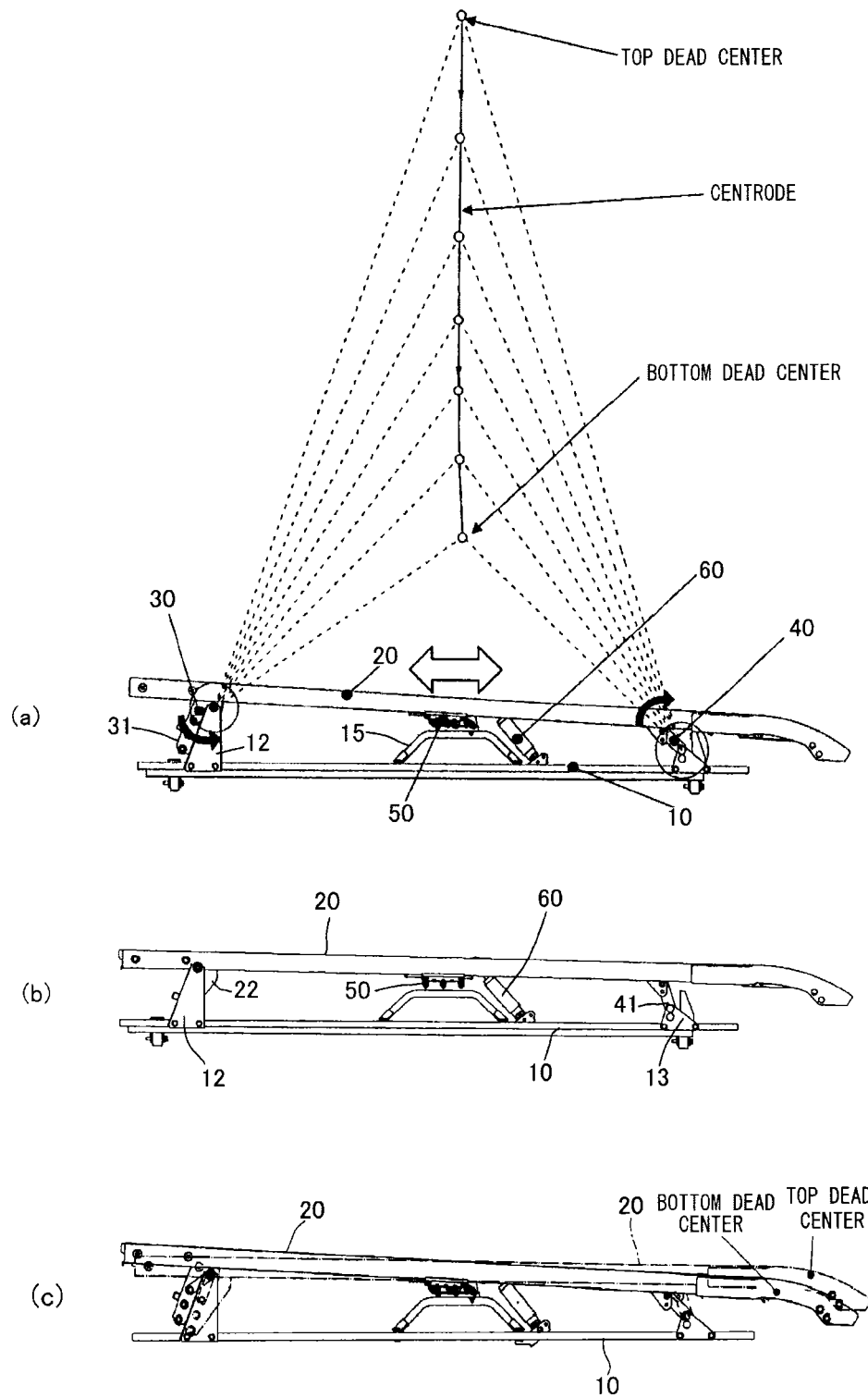
FIG. 6 are views illustrating a centrode of an upper frame and a link mechanism, (a) being a view illustrating a stable state at a bottom dead center, (b) being a view illustrating a top dead center, and (c) being a view illustrating states at the top dead center and the bottom dead center together.

Concretely, as illustrated in FIG. 5, the cylinder 61 is formed by a dual cylinder structure of a conductor 61a such as copper formed in a cylindrical shape, preferably, a circular cylindrical shape and an iron yoke (cylinder-side yoke) 61b in a cylindrical shape, preferably, a circular cylindrical shape covering an outer peripheral surface of the conductor 61a.

The piston 62 in this embodiment includes a plurality of permanent magnets 62a in a ring shape and iron yokes (piston-side yokes) 62b in a ring shape. The permanent magnets 62a and the piston-side yokes 62b are supported by a tip side of the piston rod 63 made of a non-magnetic body such as non-magnetic stainless steel being inserted.

In the magnetic damper of the flux-concentration type, the permanent magnets 62a are disposed so that the same poles of the adjacently disposed ones face each other. In the example in FIG. 5, two of the permanent magnets 62a, 62a have N poles facing each other. Then, the piston-side yokes 62b each are disposed between the adjacently disposed permanent magnets 62a, 62a. Further, preferably, the piston-side yokes 62b are also stacked on outer end portions (surfaces opposite the facing sides) of the permanent magnets 62a, 62a. Incidentally, sliding members 62c for reducing sliding resistance are provided on further outer sides of the piston-side yokes 62b.

In the magnetic damper constituting the second vibration absorbing mechanism 60, when an up and down vibration is input, the piston 62b reciprocates along an axial direction in the cylinder 61, for instance. At this time, magnetic fluxes of the permanent magnets 62a are concentrated by the piston-side yokes 62b, most of them penetrate through the conductor 61a, and the penetrating magnetic fluxes further pass through the cylinder-side yoke 61b, and therefore, an amount of the magnetic flux leaking to the outside thereof is very small. Therefore, a high damping force works in accordance with the reciprocating movement. Incidentally, as the second vibration absorbing mechanism 60, an oil damper is usable instead of the magnetic damper of the flux-concentration type.

However, according to experiments, an effect of reducing a vibration transmission rate for an up and down vibration is high both when the oil damper is used and when the magnetic damper of the flux-concentration type is used, but regarding a vibration transmission rate for a back and forth vibration, the ambulance vibration-proof rack 1 using the magnetic damper of the flux-concentration type was more excellent. This is because the oil damper has a large damping force and has a property of being hard in a low velocity range, while the magnetic damper of the flux-concentration type has a property that its damping force is small at the start of the operation and the damping force increases in accordance with an increase of the velocity. Therefore, one adopting the magnetic damper of the flux-concentration type as the second vibration absorbing mechanism 60 is more preferable than one adopting the oil damper. However, using one smaller in damping force as the oil damper makes it possible to make the vibration transmission rate for the back and forth vibration more approximate that of one adopting the magnetic damper of the flux-concentration type.

In this embodiment, by adjusting the spring constant and the damping coefficient of the magnetic damper part 510 and the magnetic spring part 520 of the first vibration absorbing mechanism 50 and by adjusting the weight of the guide portions 21c of the upper frame 20, the swinging displacement is caused between a bottom dead center and a top dead center of a trajectory of movement of a four-bar linkage illustrated in FIG. 6(a). Specifically, at the top dead center of the trajectory of movement, a substantially horizontal posture is taken as illustrated in FIG. 6(b), at other positions, an inclined posture with the front side being located higher than the rear side is taken, and at the bottom dead center, an inclination angle becomes largest. Further, in the substantially horizontal posture at the top dead center illustrated in FIG. 6(b), the movable-side permanent magnet 52b of the magnetic spring part 520 is set so as to be in a neutral state, for instance.

For example, when the ambulance starts to run, due to the rearward acceleration, the front link members 31 of the front link mechanism 30 displace in a direction so as to stand, with their pivotal support positions on the lower portions of the upper-side front brackets 22 turning rearward around their pivotal support positions on the upper portions of the base-side front brackets 12, and the rear link members 41 of the rear link mechanism 40 try to displace in a direction so as to stand, with their upper end sides pivotally supported by the upper-side rear brackets 23 turning rearward via the support shaft 42 around their pivotal support positions on the base-side rear brackets 13. Consequently, the upper frame 20 tries to displace in a direction so as to take the substantially horizontal posture. Therefore, when the up and down or back and forth vibration is input during travelling or when travelling and stopping are repeated, the front link mechanism 30 and the rear link mechanism 40 cause the swinging along the trajectory of movement of the four-bar linkage between the inclined posture and the substantially horizontal posture, so that the vibration is absorbed. Further, as illustrated in FIG. 6(a), the centrode is set so as to substantially match with the center of gravity of the upper frame 20, which is a structure in which the back and forth movement becomes more difficult to occur as the inclined posture at the bottom dead center is more approached. Therefore, the damping force is exhibited at the time of the movement from the top dead center side toward the bottom dead center side. The input vibration is absorbed by the damping force of the four-bar linkage itself and is also absorbed by the damping forces of the first vibration absorbing mechanism 50 and the second vibration absorbing mechanism 60. Further, as illustrated in FIG. 6(a), since the centrode between the top dead center and the bottom dead center is set so as to substantially match with a virtual line passing the center of gravity of the upper frame 20, the positions of the centers of gravity of the stretcher and the person are also on this virtual line, which can improve a feeling of stability of the person.

On the other hand, when a large forward acceleration is input due to sudden braking, the front link members 31 of the front link mechanism 30 displace in such a direction that their pivotal support positions on the lower portions of the upper-side front brackets 22 turn forward around their pivotal support positions on the upper portions of the base-side front brackets 12, and the rear link members 41 of the rear link mechanism 40 try to displace in a direction so as to be inclined, with their upper end sides pivotally supported by the upper-side rear brackets 23 turning forward via the support shaft 42 around their pivotal support positions on the base-side rear brackets 13. Consequently, since the upper frame 20 tries to displace in a direction so as to take the inclined posture, it displaces in such a direction that the head becomes higher, which can prevent nose dive. Incidentally, during travelling, the swinging is caused by the up and down and back and forth vibration inputs as described above, but basically, the upper frame 20 is preferably stabilized in the inclined posture where the head side (forward side) is slightly higher rather than in the substantially horizontal posture.

Since a forward descending degree of a vehicle at the time of sudden braking is generally about 5 degrees, the maximum angle of gradient of the upper frame 20 in the inclined posture relative to the base frame 10 (an angle of gradient at the bottom dead center of the centrode) is preferably set within a range of 3 to 8 degrees, and more preferably set within a range of 4 to 6 degrees relative to the horizontal direction. Further, the substantially horizontal posture in this description of course includes a case where the upper frame 20 has a horizontal (0 degree) positional relation relative to the base frame 10 but also includes a case where the upper frame 20 is slightly inclined with the front side being higher than the rear side by up to about 3 degrees.

Incidentally, the vibration absorbing mechanism is preferably of a type in which two kinds of the aforesaid magnetic dampers (the magnetic damper of the interlinkage flux type being the magnetic damper part 510 of the first vibration absorbing mechanism 50 and the magnetic damper of the flux-concentration type of the second vibration absorbing mechanism 60) are combined with the magnetic spring part 520 as described above. Next, as the second vibration absorbing mechanism 60, a type in which an oil damper is combined is preferable. However, the present invention is not limited to this, and usable is a structure in which one damper out of the following dampers a) to c) is provided or the combination of any two or more other than those exemplified above out of these is combined with the magnetic spring part 520 of the first vibration absorbing mechanism 50.

a) a magnetic damper of an interlinkage flux type including permanent magnets coupled to one of the base frame and the upper frame and disposed at predetermined intervals and a conductor slidable between the permanent magnets and coupled to the other of the base frame and the upper frame;

b) a magnetic damper of a flux-concentration type including a cylinder coupled to one of the base frame and the upper frame and a piston inserted to be reciprocatable in an axial direction in the cylinder and coupled to the other of the base frame and the upper frame, the cylinder including a cylindrical conductor and a yoke which covers an outer peripheral surface of the conductor, and the piston including a plurality of permanent magnets which are disposed along an axial direction of the cylinder, with the same poles thereof facing each other and a yoke which is disposed between the adjacent permanent magnets; and c) an oil damper including a cylinder coupled to one of the base frame and the upper frame and a piston inserted to be reciprocatable in an axial direction in the cylinder and coupled to the other of the base frame and the upper frame.

Figure 7:
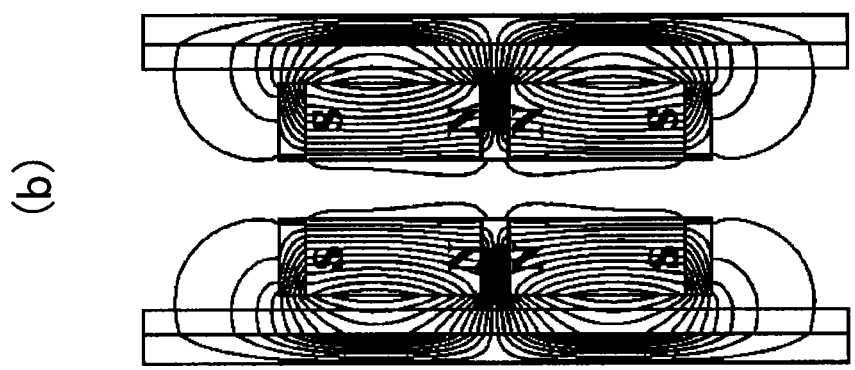
FIG. 7(a) is an analysis view illustrating magnetic flux distribution of a magnetic damper of an interlinkage flux type and FIG. 7(b) is an analysis view illustrating magnetic flux distribution of a magnetic damper of a flux-concentration type.
Figure 7:
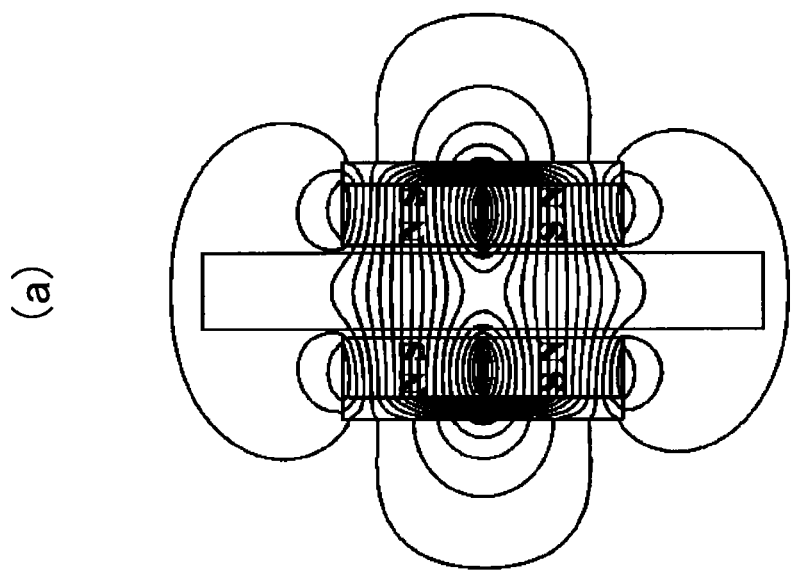
Figure 8:
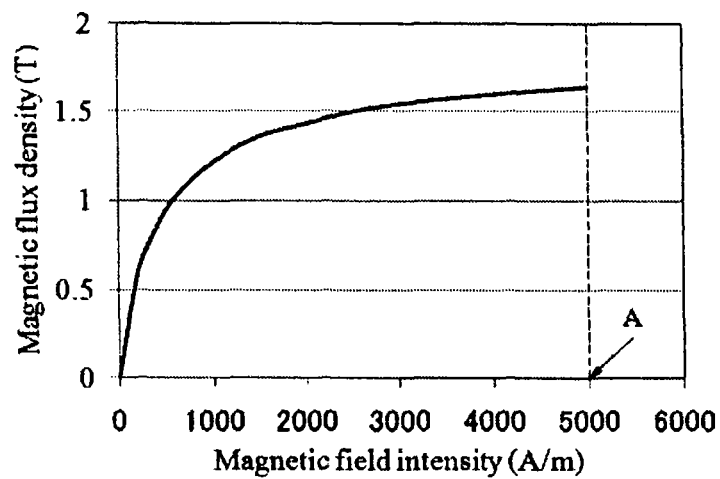
FIG. 8 is a chart illustrating a B-H curve of a yoke used in the analysis in FIG. 7.
Figure 9:
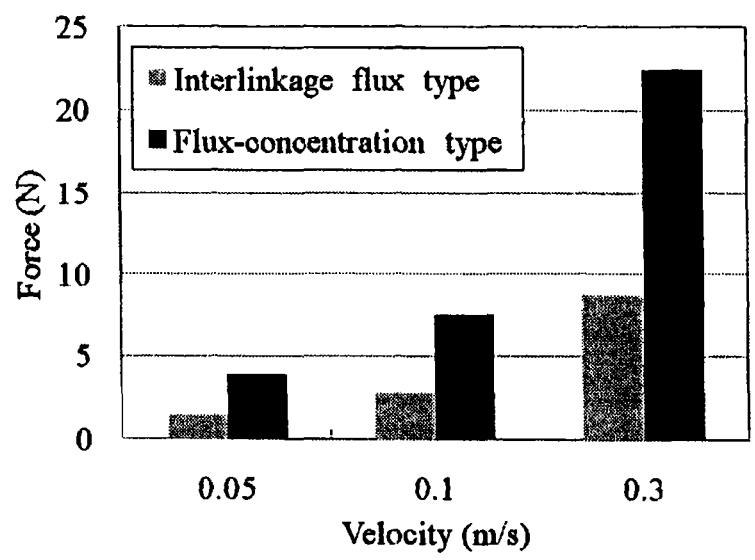
FIG. 9 is a chart illustrating the analysis results of electromagnetic forces corresponding to velocity which are generated in the dampers of the interlinkage flux type and of the flux-concentration type when the moving velocity of copper is set to 0.05 m/s, 0.1 m/s, and 0.3 m/s.

Incidentally, when a damping force was examined regarding the magnetic damper of the interlinkage flux type in which the permanent magnets were attractively disposed in an operating direction as in the magnetic damper part 510 of the first vibration absorbing mechanism 50 and the magnetic damper of the flux-concentration type in which the permanent magnets were disposed in a repulsive magnetic field as in the magnetic damper of the second vibration absorbing mechanism 60, the results illustrated in FIG. 7 to FIG. 12 were obtained. First, the analysis results of magnetic flux distribution of the both are as illustrated in FIGS. 7(*a*), (*b*). As an analysis condition, residual magnetic flux density of the magnets was set to 1.26 T and electric conductivity of copper was set to $56 \times 10^6$ S/m. FIG. 8 illustrates a B-H curve of the yoke, and nonlinear analysis using a Newton-Raphson method was conducted in magnetic fields 0 to A in the drawing, and thereafter, it was assumed that the magnetic flux density was saturated. FIG. 9 illustrates analysis results of electromagnetic forces corresponding to velocity which are generated in the dampers of the interlinkage flux type and the flux-concentration type when moving velocity of the copper was set to 0.05 m/s, 0.1 m/s, and 0.3 m/s, and it is seen that the magnetic damper of the flux-concentration type has a damping force about three times as large as that of the magnetic damper of the interlinkage flux type.

Figure 10:
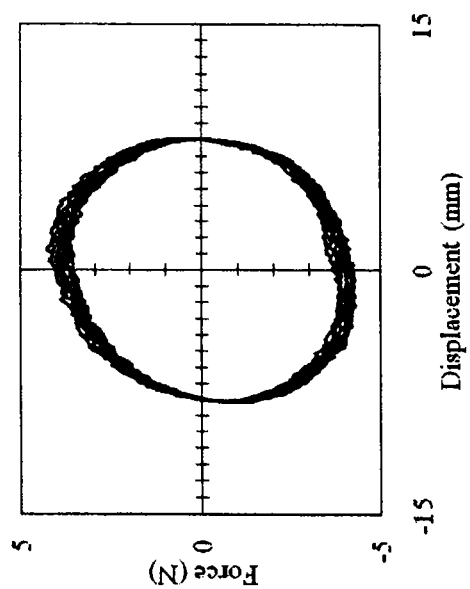
FIG. 10(a) is a chart illustrating a load-displacement property of the magnetic damper of the interlinkage flux type and FIG. 10(b) is a chart illustrating a load-displacement property of the magnetic damper of the flux-concentration type.
Figure 10:
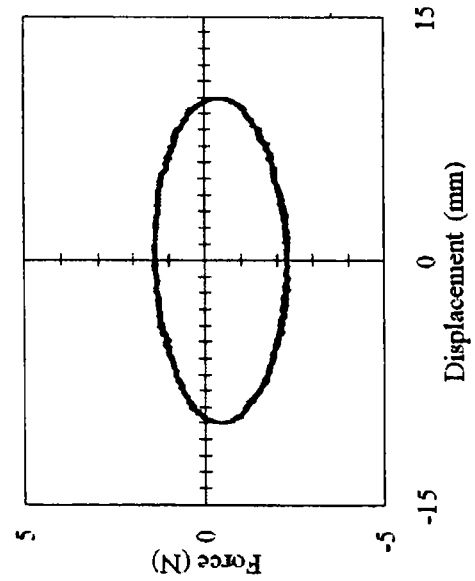
Figure 11:
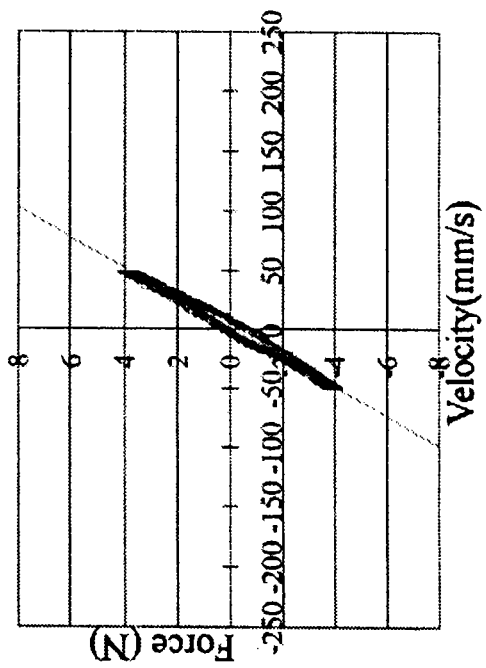
FIG. 11(a) is a chart illustrating a load-velocity property of the magnetic damper of the interlinkage flux type and FIG. 11(b) is a chart illustrating a load-velocity property of the magnetic damper of the flux-concentration type.
Figure 11:
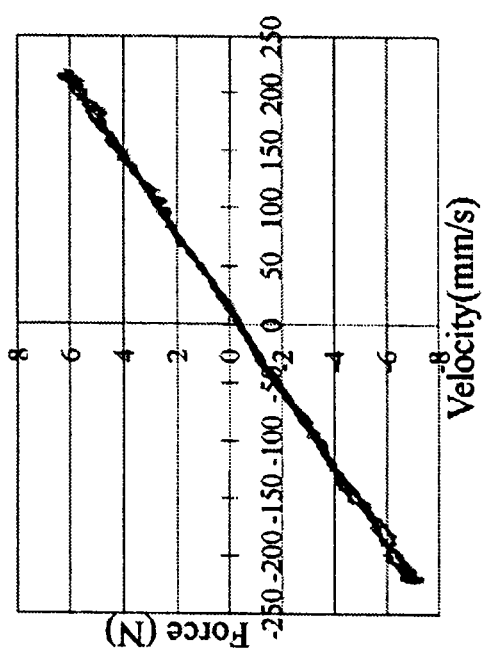
Figure 12:
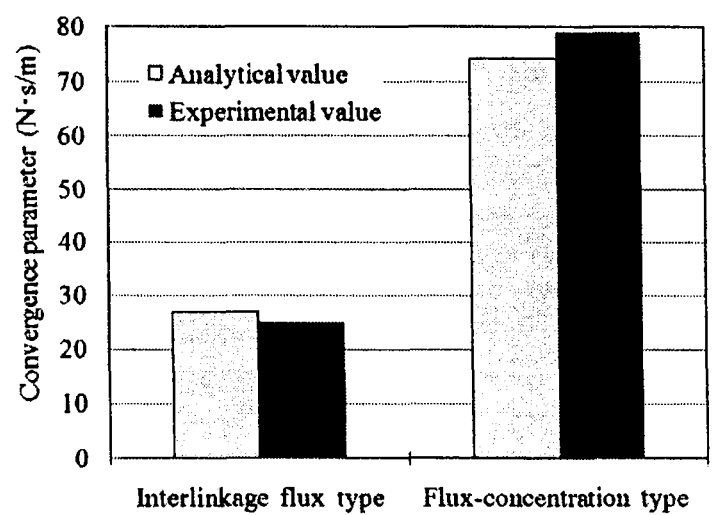
FIG. 12 is a chart illustrating analytical values and experimental values of a damping coefficient of the models used in the experimental examples.

In order to confirm, by experiments, the damping force found by the magnetic field analysis, the damping force was measured by using Servo-pulser manufactured by Shimadzu Corporation. As a waveform input to the Servo-pulser, a sine wave with 1 to 4 Hz and a 10 mm half amplitude was given in 1 Hz increments under a constant amplitude condition, and load-displacement properties of the magnetic dampers were found, which are illustrated in FIGS. 10(*a*), (*b*). Further, FIG. 11 illustrate load-velocity properties of the magnetic dampers, and FIG. 12 illustrates analytical values and experimental values of damping coefficients of the respective models. Errors between the analytical values and the experimental values were 10% or less. From FIG. 12, it is seen that in the magnetic damper of the flux-concentration type, the experimental value of the damping force is about 2.9 times as large as that in the magnetic damper of the interlinkage flux type. The magnetic damper of the interlinkage flux type has an attraction-type magnetic arrangement, and an eddy current is generated in a loop form around the inter-magnet direction of the attraction system, and therefore, not a little electromagnetic force in a direction not contributing to the damping force is generated. On the other hand, in the magnetic damper of the flux-concentration type, since an eddy current is generated in a loop form around an axial direction being a movement direction, and therefore, many electromagnetic forces in a direction effective as the damping force are generated. Further, from the magnetic flux distribution in FIG. 7, in the magnetic damper of the flux-concentration type, due to the repulsive magnet arrangement, magnetic fluxes concentrate in a magnet gap portion, and further, due to the arrangement of the yokes between the magnets, on the magnet both end portions, and on the outer sides of the conductor, the magnetic flux passing the axial center portion is reduced. Further, owing to the axial symmetry, the magnetic flux falling out of the conductor is far smaller than in the magnetic damper of the interlinkage flux type, and this is thought to be why the damping coefficient increases.

Figure 13:
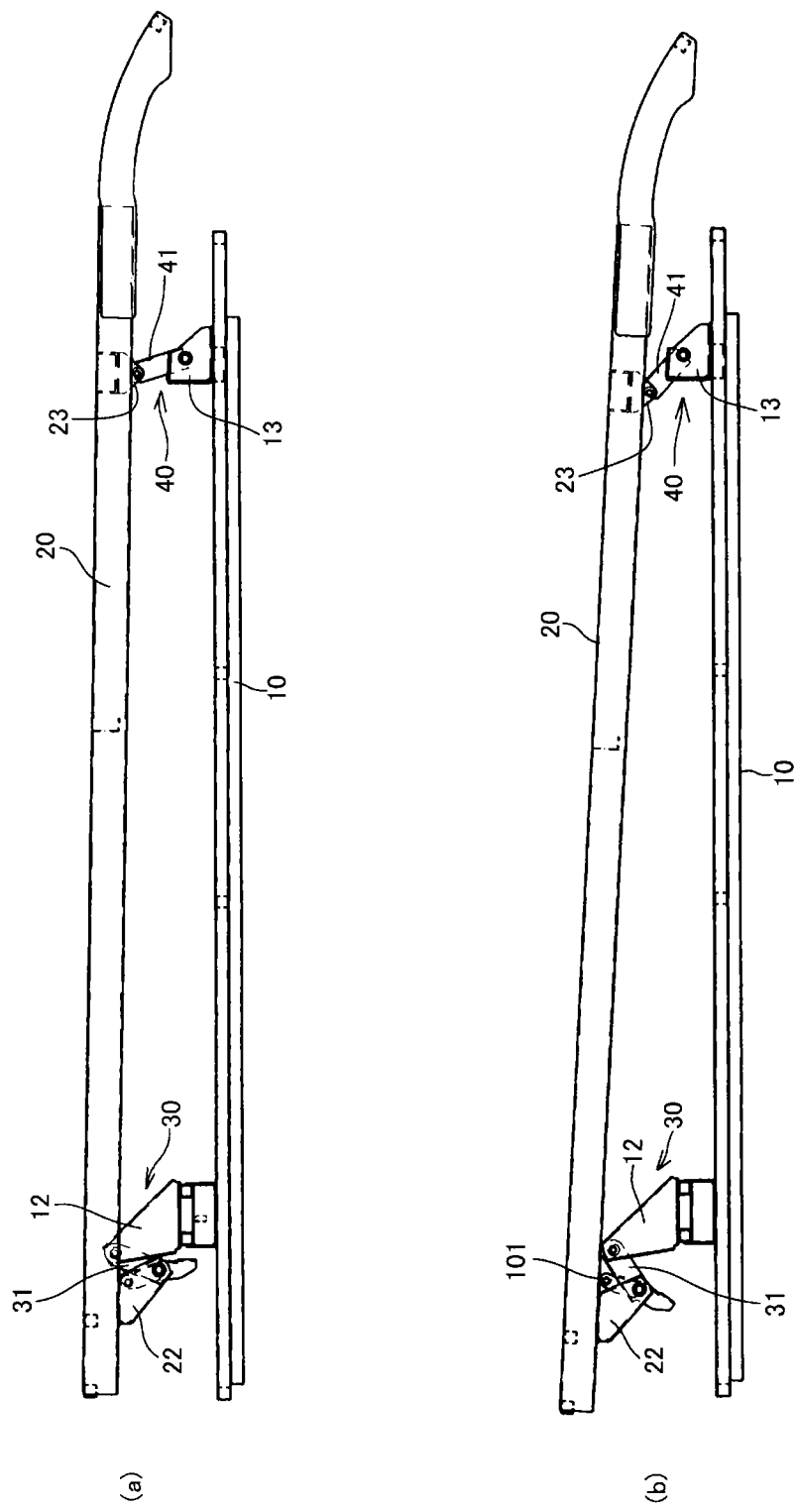
FIG. 13 are views of an ambulance vibration-proof rack, in which a base frame, the upper frame, a front link mechanism, and a rear link mechanism are extracted and illustrated, (a) being a view illustrating a state of a substantially horizontal posture at the top dead center of the centrode and (b) being a view illustrating a state of an inclined posture at the bottom dead center.

Next, the upper frame position holding structure of the above-described ambulance vibration-proof rack 1 will be described based on FIG. 13 to FIG. 19. FIG. 13 are views in which the base frame 10, the upper frame 20, the front link mechanism 30, and the rear link mechanism 40 are extracted and illustrated for easier understanding of the aforesaid displacement of the ambulance vibration-proof rack 1 along the trajectory of movement of the four-bar linkage, (a) illustrating a state of the substantially horizontal posture at the top dead center of the centrode and (b) illustrating a state of the inclined posture at the bottom dead center. The upper frame 20 displaces between the substantially horizontal posture and the inclined posture where the front side is higher, and when a treatment such as a cardiac massage is performed, an appropriate treatment cannot be performed if the upper frame 20 is in a state of being swingable. Therefore, in order to prevent the swinging, the upper frame 20 needs to be held at a predetermined position, but as described above, when its position is held, the upper frame 20 has to take the substantially horizontal posture. Further, at the time of the loading/unloading of the stretcher as well, the work is not easily done if the upper frame swings, and further, if the upper frame is fixed in the inclined state with its front side being located higher, a large force is required at the time of the loading. The upper frame position holding structure is a mechanism which, in such a case, holds the substantially horizontal posture in the state where the upper frame 20 is set to this posture.

This embodiment has, as the upper frame position holding structure, a front link mechanism control means 100 and a rear link mechanism control means 200. The front link mechanism control means 100 is an upper frame position holding mechanism used when a work is done on a front side in the ambulance while the stretcher is loaded, and the rear link mechanism control means 200 is an upper frame position holding structure used when a work is done on a rear side when the stretcher is loaded/unloaded. One of them may be provided, but the both means are preferably provided because the work is easily done on the rear side at the time of the loading/unloading of the stretcher and the work is easily done on the front side after the loading.

Figure 14:
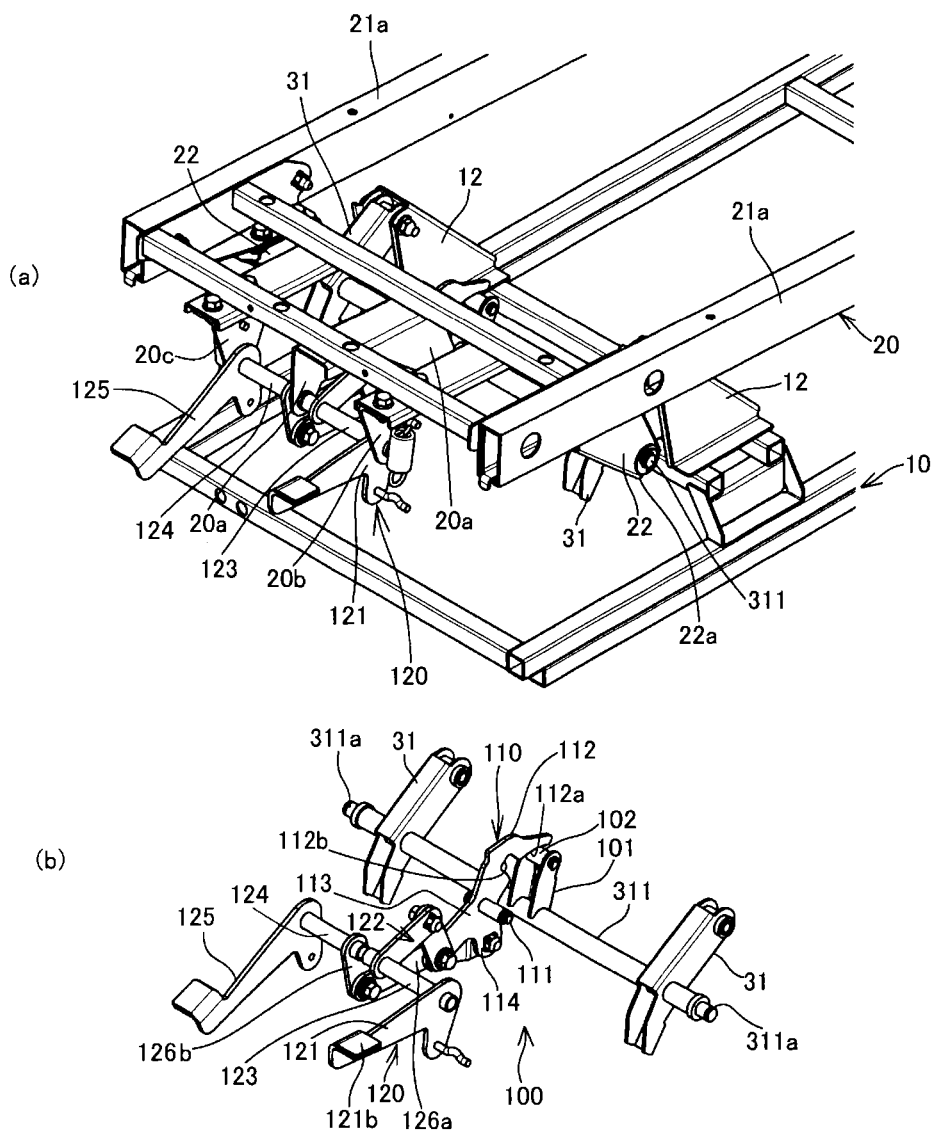
FIG. 14 are views illustrating a structure of a front link mechanism control means, (a) being a view in which the front link mechanism control means is assembled to the ambulance vibration-proof rack and (b) being a view illustrating the front link mechanism control means before it is assembled to the ambulance vibration-proof rack.

Here, in this embodiment, as illustrated in FIGS. 14(*a*), (*b*), the aforesaid front link members 31 are provided in pair apart from each other in the width direction of the upper frame 20, but they are coupled to each other by a support shaft 311 suspended between lower portions 22*a* of the upper-side front brackets 22 similarly provided in pair to be apart from each other in the width direction. End portions 311*a* of the support shaft 311 are pivotally supported by the lower portions 22*a* of the upper-side front brackets 22 so as to be rotatable, but the front link members 31 are disposed slightly closer to the inner side than the end portions 311*a* of the support shaft 311 and are fixed to the support shaft 311. In a normal use state, in accordance with the relative displacement of the upper frame 20 due to the vibration input, the pair of front link members 31 displace synchronously in accordance with the rotation of the support shaft 311, but irrespective of this movement, when an external force causing the support shaft 311 to rotate works, the front link members 31 turn in a predetermined direction in accordance with the rotation of the support shaft 311.

Figure 15:
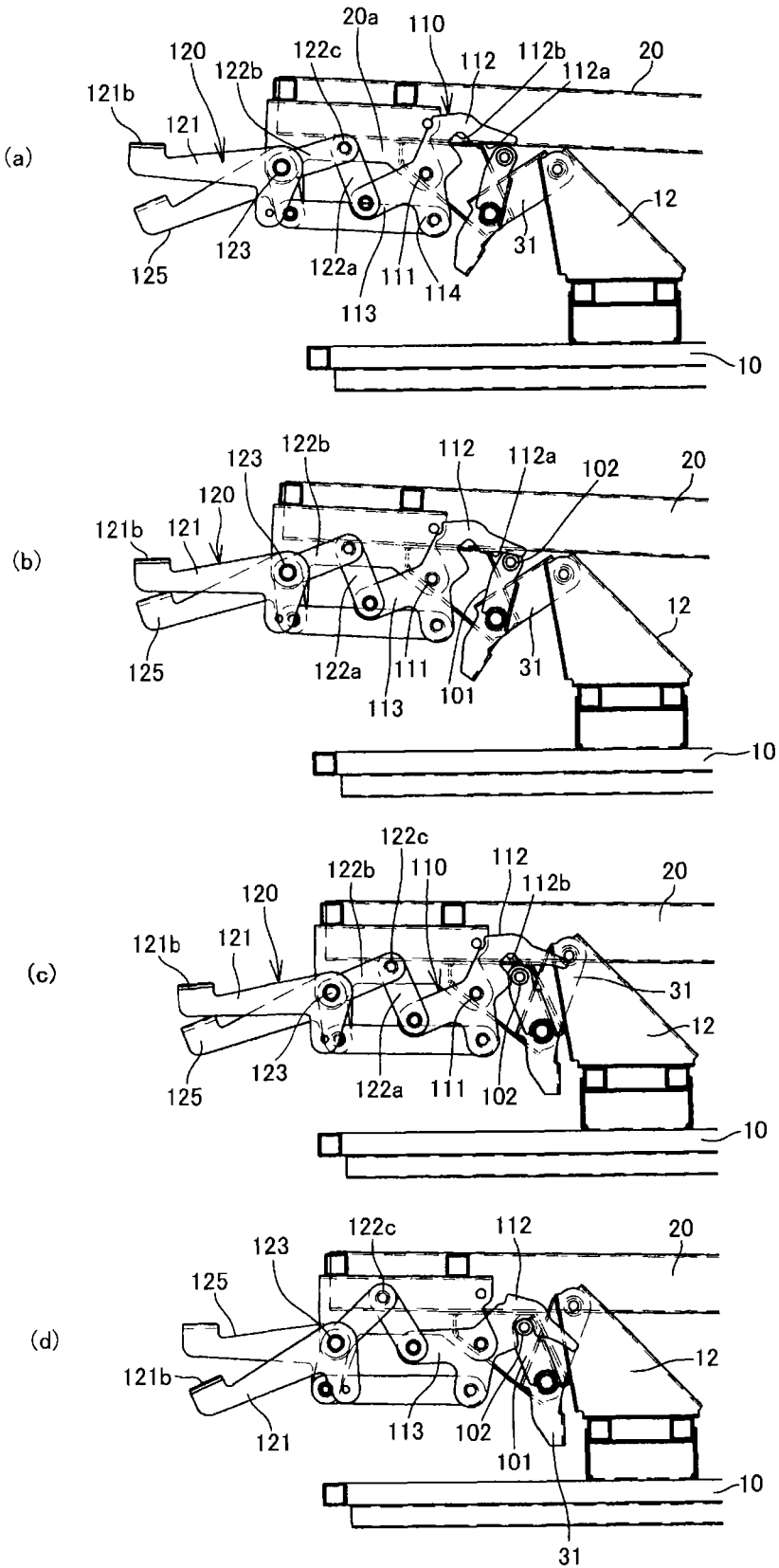
FIGS. 15(a) to (d) are views illustrating movements in a process where the upper frame is displaced to and held in the substantially horizontal posture by using the front link mechanism control means.

Firstly, the front link mechanism control means 100 is provided with an engaged part including a roller bracket 101 made up of two plate-shaped members fixed at a predetermined interval so as to protrude upward between the pair of front link members 31 in the support shaft 311 and a roller 102 suspended between the two plate-shaped members of the roller bracket 101. Incidentally, the roller bracket 101 is provided so that its projecting direction from the support shaft 311 is on a more front side than the front link members 31 in a side view, as illustrated in FIG. 15.

The front link mechanism control means 100 further has: a lock member 110 including an engaging part which engages with the roller 102 being the aforesaid engaged portion and supported by the roller bracket 101; and an operation member 120 operating the lock member 110. By operating the operation member 120, the external force forcibly causing the support shaft 311 to rotate is given.

The lock member 110 is made of a plate-shaped member, and a shaft pin 111 being the rotation center is pivotally supported by a center attachment plate 20*a* provided so as to protrude downward at a substantially widthwise center portion of the upper frame 20, and the lock member 110 has a rearward projecting piece 112 projecting substantially rearward, a forward projecting piece 113 projecting substantially forward, and a downward projecting piece 114 projecting substantially downward, with respect to the shaft pin 111. The rearward projecting piece 112 is formed in a substantially dogleg shape, and an inner surface of its tip side is formed so as to slightly curve and serves as a guide surface 112*a* which can abut on the aforesaid roller 102. Near a bent portion in the substantially dogleg shape closer to the shaft pin 111 than the guide surface 112*a*, a groove portion 112*b* engraved from the inner surface is formed, and the roller 102 is engaged with the groove portion 112*b*.

The operation member 120 includes an operation lever 121 and a connecting member 122 connecting the operation lever 121 and the lock member 110. The connecting member 122 is composed of two link plates 122*a*, 122*b* whose upper ends are coupled to each other by a pin 122*c*. A lower end of the rear-side link plate 122*a* is coupled to an end portion of the forward projecting piece 113 of the lock member 110 via a pin 113*a*, and a lower end of the front-side link plate 122*b* is fixed to a shaft member 123 fixed to a rear-side end portion 121 of the operation lever 121. This shaft member 123 has one end pivotally supported by the aforesaid center attachment plate 20*a* located at the substantially widthwise center portion and has the other end pivotally supported by attachment plates 20*b* for operation lever provided a predetermined distance apart from each other at a position that is near a front end of the upper frame 20 and is closer to one of the side frames 21*a* than the center attachment plate 20*a*, and is rotatable. The operation lever 121 has the shaft member 123 passing therethrough in the thickness direction to be fixed, and is disposed so that a front operation portion 121*b* thereof protrudes more forward than the front end of the upper frame 20, and when the external force causing the front operation portion 121*b* to be pushed down is applied, the shaft member 123 rotates.

The operation in the front link mechanism control means 100 in this embodiment is performed as follows. First, it is assumed that the upper frame 20 is in the inclined state with the front side located higher as illustrated in FIG. 15(*a*) and FIG. 16(*a*). In this state, when the upper frame 20 needs to be brought into the substantially horizontal posture, the front operation portion 121*b* of the operation lever 121 is depressed in the arrow A direction. When the front operation portion 121*b* is depressed, the shaft member 123 rotates according to a depression amount and accordingly the upper end of the front-side link plate 122*b* is slightly lifted up in a direction so as to turn front upward (the arrow B direction), as illustrated in FIG. 15(*b*) and FIG. 16(*b*). Consequently, the lower end of the rear-side link plate 122*a* is lifted up in the same direction, the lock member 110 turns slightly rearward (the arrow C direction) around the shaft pin 111, and the guide surface 112*a* abuts on the roller 102.

Figure 16:
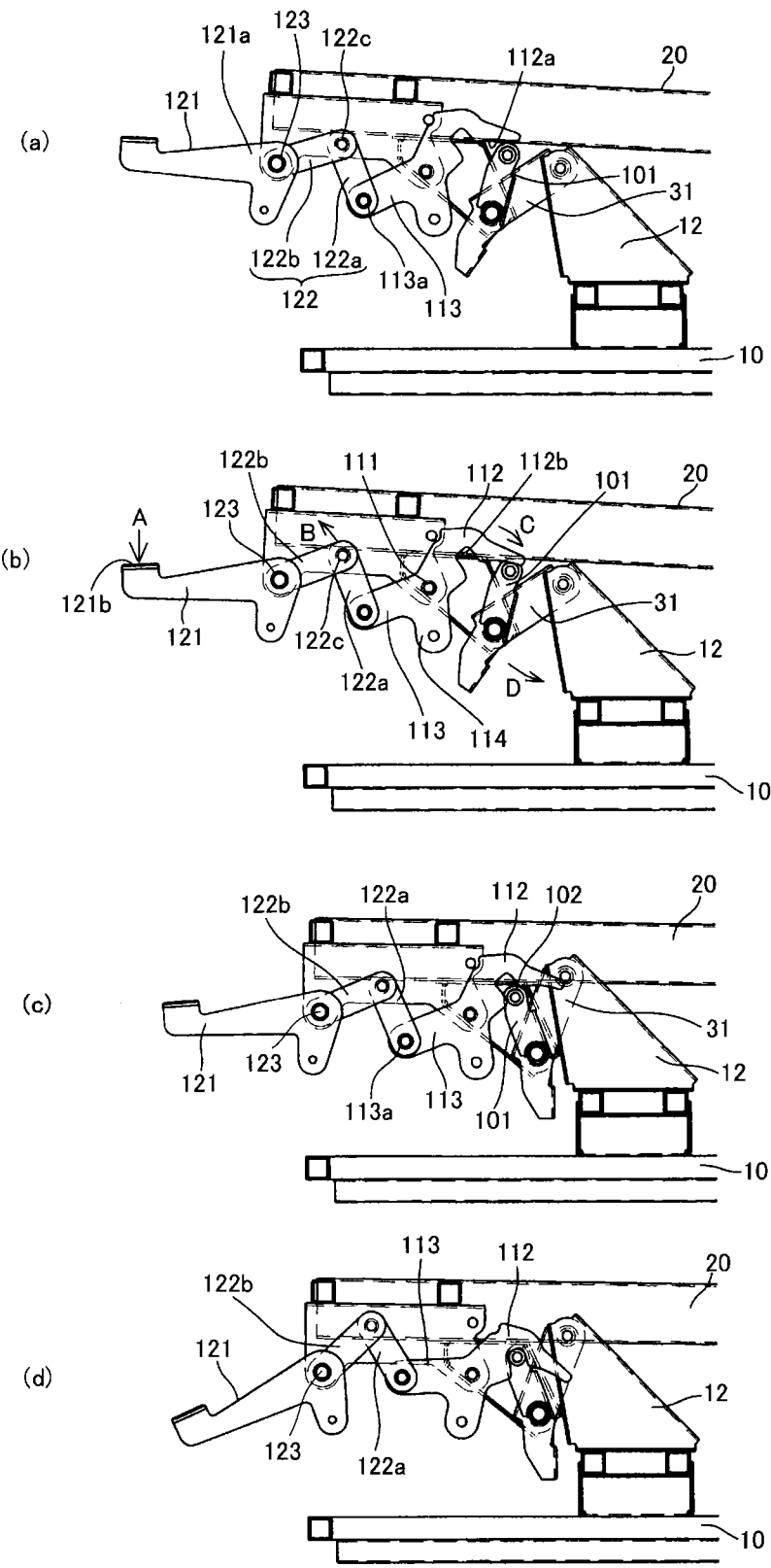
FIGS. 16(a) to (d) are views illustrating movements in the process where the front link mechanism control means displaces the upper frame to the substantially horizontal posture to hold the upper frame, with a release lever being removed.

When the front operation portion 121*b* of the operation lever 121 is further depressed, the front link members 31 of the front link mechanism 30 displace in the arrow D direction from the position in FIG. 15(*b*) and FIG. 16(*b*) to the position in FIG. 15(*c*) and FIG. 16(*c*), that is, the front link members 31 try to gradually displace so as to take a standing posture with their lower end sides turning rearward around their upper ends pivotally supported by the upper portions of the base-side front brackets 12, and accordingly, the upper frame 20 displaces so as to protrude rearward while its front side is descending, and as a result the upper frame 20 comes to take the substantially horizontal posture. When the front link members 31 thus displace in the standing direction, the support shaft 31 accordingly rotates forward, and consequently, the roller bracket 101 turns from the position in FIG. 15(b) and FIG. 16(b) to the position in FIG. 15(c) and FIG. 16(c). At this time, since the guide surface 112a of the lock member 110 is curved, the roller 102 rolls along the curved guide surface 12a to reach the vicinity of the groove portion 112b.

The position at which the upper frame 20 takes the substantially horizontal posture is the top dead center of the trajectory of movement of the four-bar linkage, and therefore, when the front operation portion 121b of the operation lever 121 is further depressed, the lock member 110 turns further rearward (the arrow C direction) around the shaft pin 111, and as illustrated in FIG. 15(d) and FIG. 15(d), the groove portion 112b engages with the roller 102. This results in locking, so that the upper frame is held in the horizontal posture. Since the direction for locking (the direction for engaging the roller 102 with the groove portion 112b of the lock member 110) by the operation of the operation lever 121 and the direction for displacing the upper frame 20 to the substantially horizontal posture substantially match with each other, that is, since the operation direction is the direction for causing the upper frame to displace in a direction so as to be pushed rearward while lowering the front side of the upper frame, it is possible to displace the upper frame 20 to and hold it in the substantially horizontal posture only by the operation of pushing down the operation lever 121.

Figure 17:
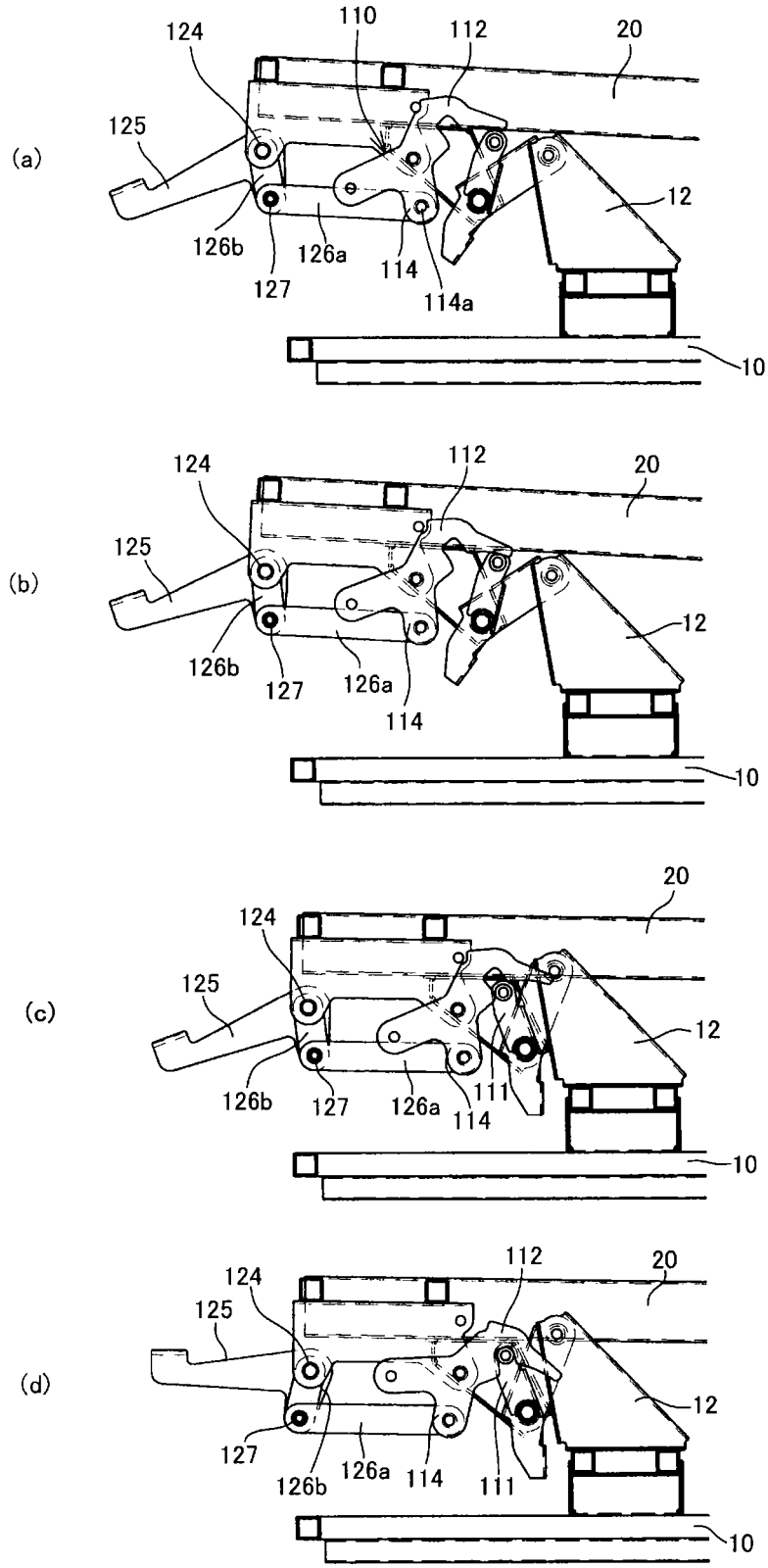
FIGS. 17(a) to (d) are views illustrating movements of the release lever in the process where the front link mechanism control means displaces the upper frame to the substantially horizontal posture to hold the upper frame.

On the other hand, in order to release the locking from the state where the upper frame 20 is locked in the substantially horizontal posture, if the aforesaid operation lever 121 is operated in a direction so as to be lifted up, the locking can be released, but in this embodiment, a release lever 125 is separately provided for easily operation. As illustrated in FIG. 14 and FIG. 17, the release lever 125 is structured so that its one end is pivotally supported by the aforesaid center attachment plate 20a located at the substantially widthwise center portion and the other end is coupled to a shaft member 124 pivotally supported by attachment plates 20c for release lever provided a predetermined distance apart from each other at a position that is near the front end of the upper frame 20 and is closer to the other side frame 21a than the center attachment plate 20a. The release lever 125 has a front link plate 126b for releasing whose upper end is coupled to the shaft member 124 and a rear link plate 126a for releasing whose front end is coupled to the front link plate 126b via a pin 127, and the rear link plate 126a for releasing extends substantially horizontally and its rear end is connected to a lower end of the downward projecting piece 114 of the lock member 110 via a pin 114a. When the upper frame 20 is controlled to the substantially horizontal posture by the operation of the aforesaid operation lever 121, the release lever 125, the front link plate 126b, and the rear link plate 126a displace as illustrated in FIGS. 15(a) to (d) and FIGS. 17(a) to (d) because the downward projecting piece 114 turns in accordance with the movement of the lock member 110. Therefore, when the upper frame 20 takes the substantially horizontal posture, the release lever 125 is projecting forward substantially horizontally as illustrated in FIG. 17(d). Then, when the release lever 125 is depressed, the lock member 110 turns forward around the shaft pin 111 and the roller 102 separates from the groove portion 112b as illustrated in FIG. 17(c). When the roller 102 separates, since the adjustment is made so that the inclined posture becomes a stable posture, the front link members 31 come to take an inclined posture from the standing position since their lower end sides turn forward around their upper ends pivotally supported by the upper portions of the base-side front brackets 12 and the front side of the upper frame 20 gradually moves upward, as illustrated in FIG. 17(b) and FIG. 17(a).

Figure 18:
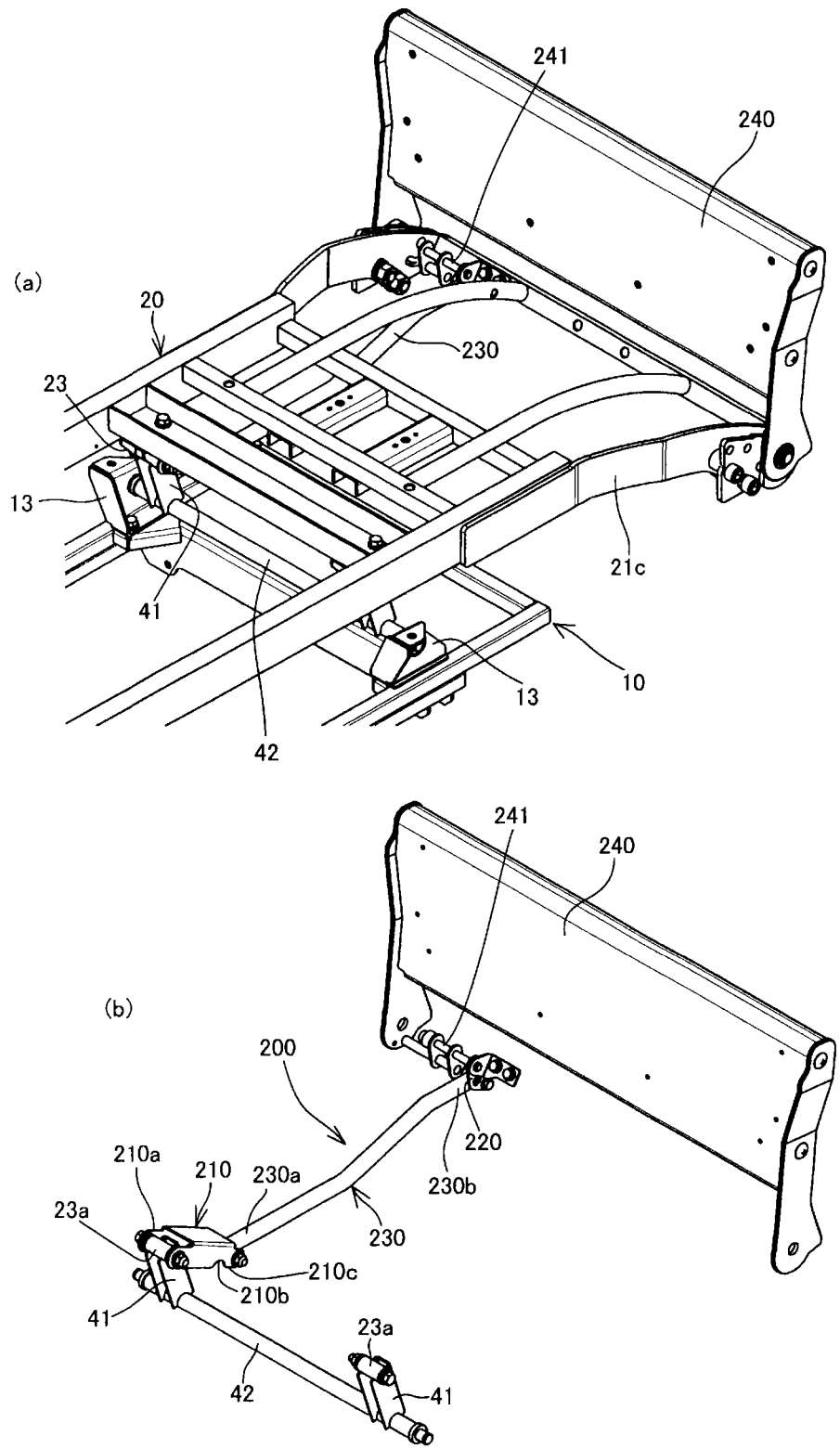
FIG. 18 are views illustrating a structure of a rear link mechanism control means, (a) being a view where the rear link mechanism control means is assembled to the ambulance vibration-proof rack and (b) being a view illustrating the rear link mechanism control means before it is assembled to the ambulance vibration-proof rack.

The rear link mechanism control means 200 has turning members 210, plate members 220, rod members 230, and a slope 240 as an operation member as illustrated in FIG. 18. The turning members 210 are disposed on rear sides of the rear link members 41, with their upper ends 210a being pivotally supported via pins 23a by the upper-side rear brackets 23 of the upper frame 20 by which the upper ends of the rear link members 41 are pivotally supported. The turning members 210 are formed to have a substantially C-shaped cross section with a width large enough to cover and overlap with parts of rear end surfaces and side surfaces of the rear link members 41. Further, the turning members 210 are longer in up/down direction length than the rear link members 41, and their middle portions 210b abut on a side surface of the support shaft 42 to which the lower ends of the rear link members 41 are fixed and which is pivotally supported between the pair of base-side rear brackets 13. Incidentally, abutting surface sides of the middle portions 210b are cut out in an arc shape so as to fit the side surface of the support shaft 42, but this shape is not indispensable and it suffices that the abutting surfaces achieve a stopper function for stopping the turning of the turning members 41 by abutting.

The slope 240 is provided on the guide portions 21c on the rear side of the upper frame 20. Concretely, the slope 240 has one end pivotally supported by the guide portions 21c via a shaft 241, is inclined rearward from the standing position illustrated in FIG. 18(a) and FIG. 19(a), and is pulled down so as to be substantially on an extension of the guide portions 21c to be used. As illustrated in FIG. 19(c), stopper members 21d are provided on side portions of the guide portions 21c, and the slope 240 is inclined until its side portions abut on the stopper members 21d. The slope 240, when used, is pulled down rearward at the time of the loading/unloading of the stretcher, is provided for smoothly guiding wheels of the stretcher onto the upper frame 20, and is set to the standing position after the stretcher is loaded.

The plate members 220 each have a predetermined length, have one ends pivotally supported by the shafts 241 by which the slope 240 is pivotally supported, and have the other ends pivotally supported by the other ends 230b of the rod members 230. The one ends 230a of the rod members 230 are pivotally supported by lower ends 210c of the turning members 210. Incidentally, because of the structure in which the shafts 241 rotate in accordance with the rotating movement of the slope 240, the plate members 220 are provided so as to turn in accordance with the rotation of the shafts 241, and the turning members 210, the plate members 220, and the rod members 230 move in accordance with the inclination movement of the slope 240, the slope 240 functions as an operation member in the rear link mechanism control means 200.

According to this embodiment, a positional relation is set so that, when the slope 240 is in the standing state, the rod members 230 are substantially horizontal and the plate members 220 are substantially perpendicular to the rod members 230, and the lower ends 210c of the turning members 210 displace rearward and their middle portions 210b are apart from the support shaft 42, as illustrated in FIG. 19(a). In this state, to whichever posture the upper frame 20 displaces according to the trajectory of movement of the four-bar linkage, the positional relation of the turning members 210, the plate members 220, and the rod members 230 does not change.

Figure 19:
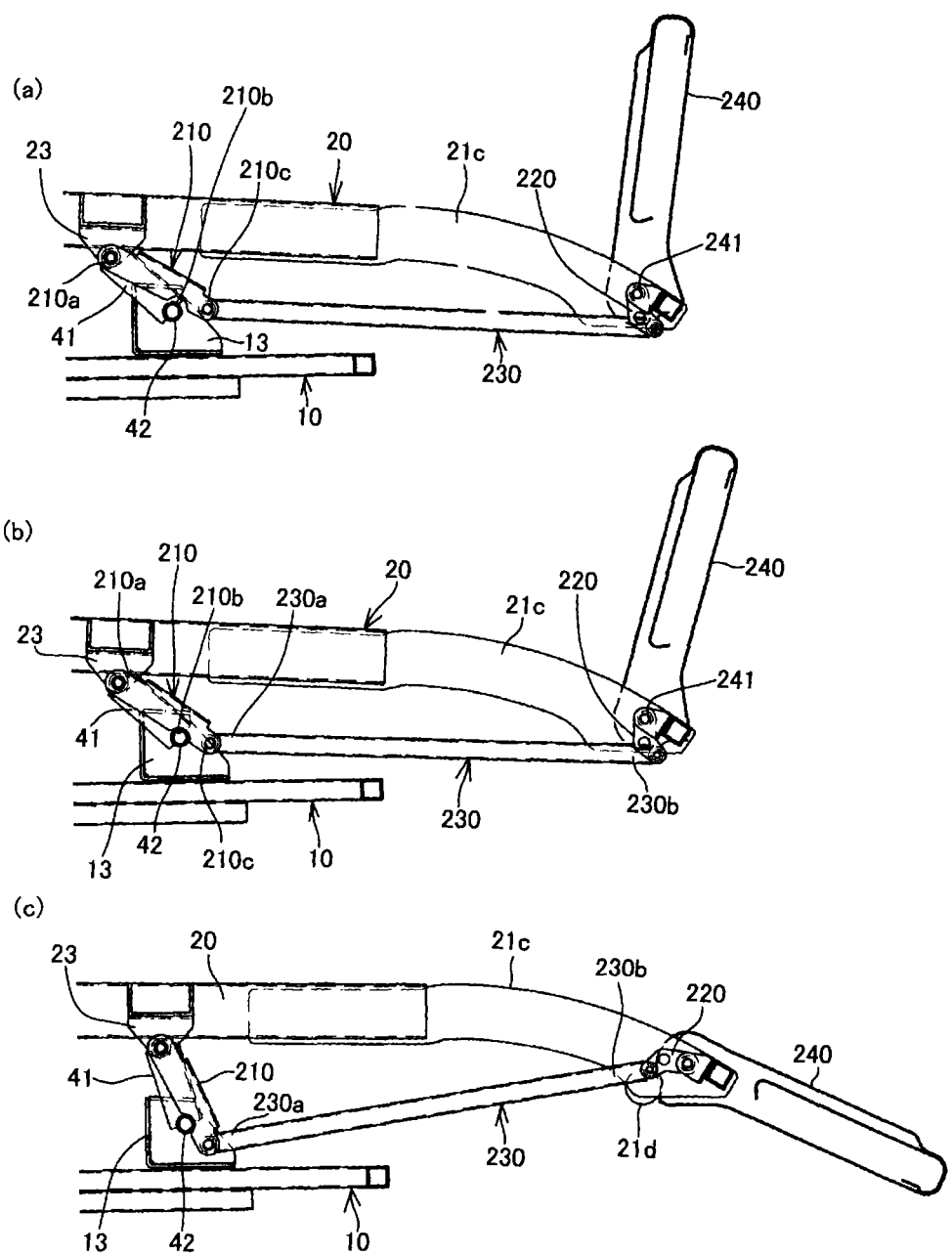
FIGS. 19(a) to (c) are views illustrating movements in a process where the upper frame is displaced to the substantially horizontal posture to be held by using the rear link mechanism control means.

At the time of the loading/unloading work of the stretcher, a rear hatch of the ambulance is opened, and the slope 240 is pulled down to be used, and at this time, a worker is outside the rear hatch and operates the slope 240 so as to pull out the slope 240 to a near side (right side in FIG. 19). When the slope 240 starts to incline, the middle portions 210b of the turning members 210 abut on the support shaft 42 as illustrated in FIG. 19(b). When the slope 70 is pulled out to a nearer side in this state, a force thereof turns the upper end sides of the rear link members 41 clockwise rearward around the support shaft 42, so that the rear link members 41 gradually displace in the standing direction, and as illustrated in FIG. 19(c), the upper frame 20 takes the substantially horizontal posture. During this period, that is, during a period from the state in FIG. 19(b) to the state in FIG. 19(c), the slope 240 is pulled down until abutting on the stopper members 21d, but the other ends of the plate members 220 turn forward clockwise from a downward facing position around the shaft 241. Therefore, due to the displacement of the plate members 220, the other ends 230b of the rod members 230 displace upward, and at an instant when the upper frame 20 takes the substantially horizontal posture in FIG. 19(c), the rod members 230 and the plate members 220 are substantially on the same straight line. Consequently, the middle portions 210b of the turning members 210 are in a state of being pressed against the support shaft 42, so that the upper frame 20 is locked without moving even if given a force in the bottom dead center direction, and the substantially horizontal posture is held.

In order to release the locking, the slope 240 is pressed forward while being returned in the standing direction, then the slope 240 changes from the state in FIG. 19(c) to the states in FIG. 19(b) and FIG. 19(a), so that it is possible to easily release the locking.

Incidentally, in the ambulance vibration-proof rack 1 of this embodiment, it is preferable that the centrode between the top dead center and the bottom dead center of the four-bar linkage substantially matches with the virtual line passing the center of gravity of the upper frame as described above. This is because, with this structure, the rotation movement in which the back and forth movement and the up and down movement are combined is more difficult to occur at a position closer to the bottom dead center, resulting in a structure making it more difficult for the four-bar linkage to move as it moves in the bottom dead center direction and capable of exhibiting the damping force. That is, generally, a bottom touch occurs at the bottom dead center and an impact vibration is input to a person side, but higher stability is obtained at a position closer to the bottom dead center owing to a spring force, the damping force, and a mass, and further the damping operation accompanying a reduction in actuation efficiency of the link acts, which can suppress the bottom touch, resulting in a property close to the property of a rigid body at the bottom dead center.

The ambulance vibration-proof rack 1 of this embodiment thus has a structure to convert into the half-pendulum motion along the trajectory of movement of the four-bar linkage and absorb it, and therefore, it has a property close to that of a rigid body for the up and down vibration and is capable of reducing a vibration transmission rate at a resonance point for the up and down and back and forth input vibrations by making use of this property, as compared with a conventional one in which a vibration absorbing mechanism functioning to suppress the up and down vibration and a vibration absorbing mechanism functioning to suppress the back and forth vibration are separately provided. This can be achieved in such a manner that, by causing the stable inclined posture at the bottom dead center and repeating minute vibrations at the bottom dead center, it is possible to convert a phase lag not causing opposite phases, which occurs by a structural damping (for example, about 90-degree phase lag) to a phase lag of preferably 160 degrees to 180 degrees and to make opposite phases in a low-frequency band, and further, a returning velocity at the unstable top dead center where the substantially horizontal posture is taken is increased. In recent years, in accordance with an increase in diameter and width of vehicle tires, an unsprung mass has been increasing and a loading weight has also been increasing, and underbody parts have been made by firm springs, but the firm springs deteriorate vibrational riding comfortability. Therefore, the vibrational riding comfortability needs to be adjusted by a damper, but the matching of a suspension of a vehicle and a suspension mechanism of a vibration-proof rack is difficult. However, according to the ambulance vibration-proof rack 1 of this embodiment, the vibration transmission rate at the resonance point in the up and down direction is reduced owing to the property of the rigid body (a resonance region becomes narrow), which facilitates the matching of the both. On the other hand, vibrational energy generated by the up and down direction input is converted to the back and forth direction in an equilibrium state near the bottom dead center where the minute vibrations are repeated, so that the vibration transmission rate in the up and down direction becomes lower than 1, resulting in a damping range, while the vibration transmission rate is 1 in the property of a rigid body, so that the vibration energy in the up and down direction is attenuated. Further, since the state where the head is lifted up is a reference position, it is also possible to damp the vibration by utilizing the weight of a person as well, and in addition, owing to a constant attempt to return to the stable state, this structure reduces a swinging feeling of the head.

Further, the vibration absorbing mechanism has the structure co-using the magnetic damper of the interlinkage flux type, the magnetic damper of the flux-concentration type, and the magnetic spring, which can exhibit a higher vibration absorbing property In particular, by using the columnar magnetic damper of the flux-concentration type in which the magnets are repulsively arranged and the conductor is disposed around the permanent magnets, it is possible to exhibit a high damping force.

EXPLANATION OF REFERENCE SIGNS

1 ambulance vibration-proof rack
10 base frame
12 base-side front bracket
13 base-side rear bracket
20 upper frame
22 upper-side front bracket
30 front link mechanism
31 front link member
311 support shaft
40 rear link mechanism
41 rear link member
42 support shaft
50 first vibration absorbing mechanism
510 magnetic damper part
520 magnetic spring part
60 second vibration absorbing mechanism
100 front link mechanism control means
101 roller bracket
102 roller
110 lock member
112a guide surface
112b groove portion 120 operation member
121 operation lever
200 rear link mechanism control means
210 turning member
220 plate member
230 rod member
240 slope

The invention claimed is:

1. An upper frame position holding structure used for an ambulance vibration-proof rack having a stretcher-supporting upper frame which is attached to a base frame via a link mechanism including a front link mechanism located on a front side and a rear link mechanism located on a rear side, is swingable along a trajectory of movement of a four-bar linkage by the link mechanism including the front link mechanism and the rear link mechanism, and has a position where a substantially horizontal posture is taken in the trajectory of movement, while, at other positions, taking an inclined posture with a front side being located higher than a rear side,
the upper frame position holding structure comprising at least one of a front link mechanism control means and a rear link mechanism control means,
wherein, irrespective of a position of the upper frame in the trajectory of movement, the link mechanism including the front link mechanism and the rear link mechanism is locked in a state where the upper frame is displaced to the substantially horizontal posture,
wherein the front link mechanism control means includes an operation member which, when given an external force, brings the upper frame into the substantially horizontal position by displacing the upper frame rearward while lowering the front side of the upper frame, and locks the front link mechanism in the state where the upper frame is brought into the substantially horizontal posture, to hold the upper frame in the substantially horizontal posture, and
wherein the rear link mechanism control means includes an operation member which, when given an external force, brings the upper frame into the substantially horizontal posture by displacing the upper frame rearward while raising the rear side of the upper frame, and locks the rear link mechanism in the state where the upper frame is brought into the substantially horizontal posture, to hold the upper frame in the substantially horizontal posture.

2. The upper frame position holding structure according to claim 1, wherein, when the operation member is given the external force in a direction so as to be pushed down, the front link mechanism control means displaces the upper frame rearward while lowering the front side of the upper frame.

3. The upper frame position holding structure according to claim 2,
wherein the front link mechanism includes: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket,
wherein the rear link mechanism includes a rear link member which includes a lower end pivotally supported by the base frame and an upper end pivotally supported by the upper frame and which displaces in a standing direction in accordance with the displacement in the direction for the substantially horizontal posture, with the upper end side turning rearward around the lower end,
wherein the front link mechanism control means includes: an engaged portion attached to a support shaft via which the front link member is pivotally supported by the lower portion of the upper-side front bracket, and turning forward to thereby turn the front link member via the support shaft in the standing direction around the pivotal support position on the upper portion of the base-side front bracket; and a lock member including an engaging portion which engages with the engaged portion when the engaged portion turns forward, and
wherein the front link mechanism control means operates so as to cause the engaging portion of the lock member to engage with the engaged portion when the operation member is given the external force in the direction so as to be pushed down.

4. The upper frame position holding structure according to claim 3,
wherein the engaged portion includes a roller bracket fixed to the support shaft and a roller rotatably supported by the roller bracket,
wherein the lock member includes a groove portion as the engaging portion and includes a guide surface provided adjacent to the groove portion and abuttable on the roller of the engaged portion, and
wherein, when the operation member is pushed down, the front link member turns in the standing direction to displace the upper frame into the substantially horizontal posture, the lock member rotates from an upper direction in a rear downward direction, the guide surface abuts on the roller, and the roller relatively displaces along the guide surface to engage with the groove portion.

5. The upper frame position holding structure according to claim 1, wherein, when the operation member is given the external force in a direction so as to be drawn rearward, the rear link mechanism control means displaces the upper frame rearward while raising the rear side of the upper frame.

6. The upper frame position holding structure according to claim 1,
wherein the front link mechanism includes: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket,
wherein the rear link mechanism includes a rear link member which includes a lower end pivotally supported by the base frame and an upper end pivotally supported by the upper frame and which displaces in a standing direction in accordance with the displacement in the direction for the substantially horizontal posture, with the upper end side turning rearward around the lower end, wherein the rear link mechanism control means includes:

a turning member whose upper end is pivotally supported by the upper frame together with the upper end of the rear link member and whose middle portion closer to the lower end is abuttable on the support shaft of the rear link member;

a slope as the operation member provided on the rear side of the upper frame so as to be inclinable rearward from a standing position;

a plate member provided in a posture with one end pivotally supported at a pivotal support position of the slope on the upper frame and with another end extending downward when the slope is at the standing position, and displacing between a standing position and an inclination position in accordance with a movement of the slope; and a rod member having one end pivotally supported by the lower end of the turning member and having another end pivotally supported by the other end of the plate member, and wherein, when the slope is inclined to give the external force causing the upper frame to be drawn rearward, the plate member turns to displace from the standing position at which the plate member becomes substantially vertical to the rod member to the inclination position at which the plate member becomes substantially on a same straight line with the rod member, and when the rear link member is displaced in a direction so as to stand to make the middle portion of the turning member abut on the support shaft, the upper frame is held in the substantially horizontal posture.

7. An ambulance vibration-proof rack which includes a base frame and an upper frame attached to the base frame via a link mechanism and swingable up and down and back and forth relatively to the base frame, and supports a stretcher on the upper frame, wherein the link mechanism includes a front link mechanism located on front sides of the base frame and the upper frame and a rear link mechanism located on rear sides of the base frame and the upper frame, wherein the upper frame is swingable along a trajectory of movement of a four-bar linkage by the link mechanism including the front link mechanism and the rear link mechanism, has a position at which a substantially horizontal posture is taken in the trajectory of movement, while, at other positions, taking an inclined posture, with a front side being located higher than a rear side, and converts an input up and down or back and forth vibration into a half-pendulum motion along the trajectory of movement of the four-bar linkage to absorb the input vibration, and wherein the ambulance vibration-proof rack includes the upper frame position holding structure according to claim 1.

8. The ambulance vibration-proof rack according to claim 7, wherein a centrode of the four-bar linkage from a top dead center to a bottom dead center is set so as to substantially match with a virtual line passing a center of gravity of the upper frame.

9. The ambulance vibration-proof rack according to claim 7, wherein the inclined posture at the bottom dead center is set so that the front side is inclined upward relatively to a horizontal direction by an inclination angle within a range of 3 to 8 degrees.

10. The ambulance vibration-proof rack according to claim 7, wherein the front link mechanism includes: a front link member which is pivotally supported between an upper portion of a base-side front bracket provided on the base frame to project upward and a lower portion of an upper-side front bracket provided on the upper frame to project downward, with the upper-side front bracket being disposed so that the lower portion thereof is located lower than the upper portion of the base-side front bracket in a movable range, and which displaces in a standing direction in accordance with the displacement in a direction for the substantially horizontal posture, with a pivotal support position thereof on the lower portion of the upper-side front bracket turning rearward around a pivotal support position thereof on the upper portion of the base-side front bracket, and wherein the rear link mechanism includes a rear link member which includes a lower end pivotally supported by the base frame and an upper end pivotally supported by the upper frame and which displaces in a standing direction in accordance with the displacement in the direction for the substantially horizontal posture, with the upper end side turning rearward around the lower end.

11. The ambulance vibration-proof rack according to claim 7, comprising a magnetic spring which includes permanent magnets coupled to one of the base frame and the upper frame and disposed at predetermined intervals and a movable-side permanent magnet slidable between the permanent magnets and coupled to the other of the base frame and the upper frame.

12. The ambulance vibration-proof rack according to claim 7, further comprising a vibration absorbing mechanism which absorbs a vibration between the base frame and the upper frame, wherein the vibration absorbing mechanism includes at least one damper out of the following dampers a) to c):

a) a magnetic damper of an interlinkage flux type including permanent magnets coupled to one of the base frame and the upper frame and disposed at predetermined intervals and a conductor slidable between the permanent magnets and coupled to the other of the base frame and the upper frame;

b) a magnetic damper of a flux-concentration type including a cylinder coupled to one of the base frame and the upper frame and a piston inserted to be reciprocatable in an axial direction in the cylinder and coupled to the other of the base frame and the upper frame, the cylinder including a cylindrical conductor and a yoke which covers an outer peripheral surface of the conductor, and the piston including a plurality of permanent magnets which are disposed along an axial direction of the cylinder with the same poles thereof facing each other, and a yoke which is disposed between the adjacent permanent magnets; and c) an oil damper including a cylinder coupled to one of the base frame and the upper frame and a piston inserted to be reciprocatable in an axial direction in the cylinder and coupled to the other of the base frame and the upper frame.

* * * * *